United States Patent
Wong et al.

(10) Patent No.: US 12,200,470 B2
(45) Date of Patent: *Jan. 14, 2025

(54) METHODS AND APPARATUS FOR SUPPORTING EFFICIENT MULTI-UNIVERSAL SUBSCRIBER IDENTIFY MODULE (MUSIM) USER EQUIPMENT (UE) OPERATION USING A MULTI-PATH PROXY

(71) Applicant: Charter Communications Operating, LLC, St. Louis, MO (US)

(72) Inventors: Curt Wong, Bellevue, WA (US); Yildirim Sahin, Englewood, CO (US); Umamaheswar Kakinada, Greenwood Village, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/369,752

(22) Filed: Sep. 18, 2023

(65) Prior Publication Data
US 2024/0089709 A1    Mar. 14, 2024

Related U.S. Application Data

(63) Continuation of application No. 17/491,488, filed on Sep. 30, 2021, now Pat. No. 11,765,556.

(51) Int. Cl.
*H04W 4/12* (2009.01)
*H04W 8/18* (2009.01)
*H04W 28/06* (2009.01)
*H04W 68/00* (2009.01)
*H04W 84/04* (2009.01)

(52) U.S. Cl.
CPC ............. *H04W 4/12* (2013.01); *H04W 8/183* (2013.01); *H04W 28/06* (2013.01); *H04W 68/005* (2013.01); *H04W 84/042* (2013.01)

(58) Field of Classification Search
CPC ........ H04W 4/12; H04W 8/183; H04W 28/06; H04W 84/042
See application file for complete search history.

(56) References Cited

U.S. PATENT DOCUMENTS 11,057,865 B1 * 7/2021 Wong .................. H04W 68/005
2022/0369280 A1 * 11/2022 Ryu ....................... H04W 68/02

* cited by examiner

*Primary Examiner* — Wayne H Cai
(74) *Attorney, Agent, or Firm* — Straub & Straub; Michael P. Straub; Stephen T. Straub

(57) ABSTRACT

A communications system includes a non-MUSIM enhanced PLMN and a MUSIM enhanced PLMN. The MUSIM enhanced PLMN includes a novel Multi-Path (MP) Proxy node. The MP Proxy Node is controlled to switch between two alternative DL data flow paths to facilitate graceful path changeovers. Downlink (DL) data flow toward the non MUSIM enhanced network (e.g., PLMN-A) is based on the interaction between the MUSIM UE and the MUSIM enhanced network (e.g., PLMN-B) together with the novel MultiPath (MP) Proxy node.

20 Claims, 17 Drawing Sheets

| FIGURE 6A |
|---|
| FIGURE 6B |
| FIGURE 6C |
| FIGURE 6D |

FIGURE 6

METHODS AND APPARATUS FOR SUPPORTING EFFICIENT MULTI-UNIVERSAL SUBSCRIBER IDENTIFY MODULE (MUSIM) USER EQUIPMENT (UE) OPERATION USING A MULTI-PATH PROXY

RELATED APPLICATIONS

The present application is a continuation of U.S. patent application Ser. No. 17/491,488 filed Sep. 30, 2021 which was Published on Mar. 30, 2023 as Publication No.: US 2023-0097792 A1 and which is hereby expressly incorporated by reference in its entirety.

FIELD

The present application relates to wireless communication methods and apparatus, and more particularly, to methods and apparatus for supporting efficient MUSIM UE operation using a Multi-Path (MP) Proxy in a communications system including a first PLMN which is not MUSIM enhanced and a second PLMN which is MUSIM enhanced.

BACKGROUND

In certain deployments, it is possible that only one of two Public Land Mobile Networks (PLMNs) is enhanced with MUSIM feature. For a PLMN which has not been enhanced with MUSIM feature, the UE may not be able to leave and come back to the non-enhanced PLMN in a graceful manner, resulting in bad key performance indicators (KPIs) and wasted paging resources.

Based on the above, there is a need for new Methods and Apparatus for supporting MUSIM UE operation in systems in which a MUSIM device desires to use and switch between a non-MUSIM enhanced PLMN and a MUSIM enhanced PLMN.

SUMMARY

Various embodiments are directed to using a Multi-Path Proxy node in situations where a Multi-Universal Subscriber Identity Module (MUSIM) device, e.g., a mobile UE with a Multi-USIM, is interacting with two Public Land Mobile Networks (PLMNs) one which is enhanced to handle graceful switching by the UE between the two PLMNs and one which is not. The use of the Multi-Path Proxy node avoids wasting paging resources by the PLMNs as well as overcomes issues wherein key performance indicators do not correctly or appropriately reflect the state of the communications between the UE and the PLMNs.

Various features of some embodiments of the present invention, are based on the idea of controlling the downlink (DL) data flow toward the non MUSIM enhanced network (e.g., PLMN-A) based on the interaction between the MUSIM UE and the MUSIM enhanced network (e.g., PLMN-B) together with a novel MultiPath (MP) Proxy node. When there is no more data to be transmitted between the UE and the network in PLMN-A, its RAN will release the UE from the radio access link as is normally done today.

The MUSIM enhanced PLMN, e.g., PLMN-B, includes a novel Proxy component, e.g., a Multi-Path (MP) Proxy, which is controlled, to switch a DL data path for a MUSIM UE, between a path which flows through the non-enhanced PLMN and a path which flows through the MUSIM enhanced PLMN. The switching is based on MUSIM channel quality and/or signal strength measurements of the alternative PLMNs, as well as detected conditions, e.g., detected paging for a voice session on the non-MUSIM enhanced PLMN.

One or more methods described herein can be used to minimize disruption in communication between a MUSIM UE and two access networks with different PLMNs, only one of which has enhanced MUSIM capabilities. This can: i) help to avoid unnecessary handovers, ii) provide end to end throughput enhancement and/or iii) help to minimize connection loss due Radio Link Failures (RLF).

In some embodiments, the MUSIM UE sends indication messages to notify the MUSIM enhanced PLMN of the following: "I am back", "I am leaving but will return shortly", and "I am leaving for a long time". In response to a "I am back" indication, the enhanced PLMN starts preparing for user plane connection. In response to a short leave notification, DL data from the MP Proxy may be, and sometimes is, buffered in the UPF, while there is no user plane establishment toward the RAN. The short leave from the MUSIM enhanced network allows the MUSIM UE to gracefully exit from the non-MUSIM enhanced PLMN.

An exemplary communications method, in accordance with some embodiments, comprises: receiving, from a Multi-Universal SIM (MUSIM) UE connected to a first Public Land Mobile Network (PLMN) that does not support MUSIM UE away messaging, at an Access and Mobility Management Function (AMF) of a second Public Land Mobile Network (PLMN) that supports MUSIM UE away messaging and which includes a proxy component for supporting interaction with a PLMN that does not support MUSIM UE away messaging, an "I am back" message; in response to the received "I am back" message operating the AMF of the second PLMN to signal a Session Management Function (SMF) of the second PLMN to start preparing a user plane connection for the MUSIM UE; and operating the SMF to instruct the proxy component to switch a downlink (DL) path for the MUSIM UE from the first PLMN to the second PLMN.

Not all features described in the summary are included in all embodiments. Numerous variations and features are possible with some of the various additional contemplated features and embodiments being described in the detailed description included below.

BRIEF DESCRIPTION OF THE FIGURES

FIG. 6 comprises the combination of FIG. 6A, FIG. 6B, FIG. 6C and FIG. 6D.

DETAILED DESCRIPTION

Figure 1:
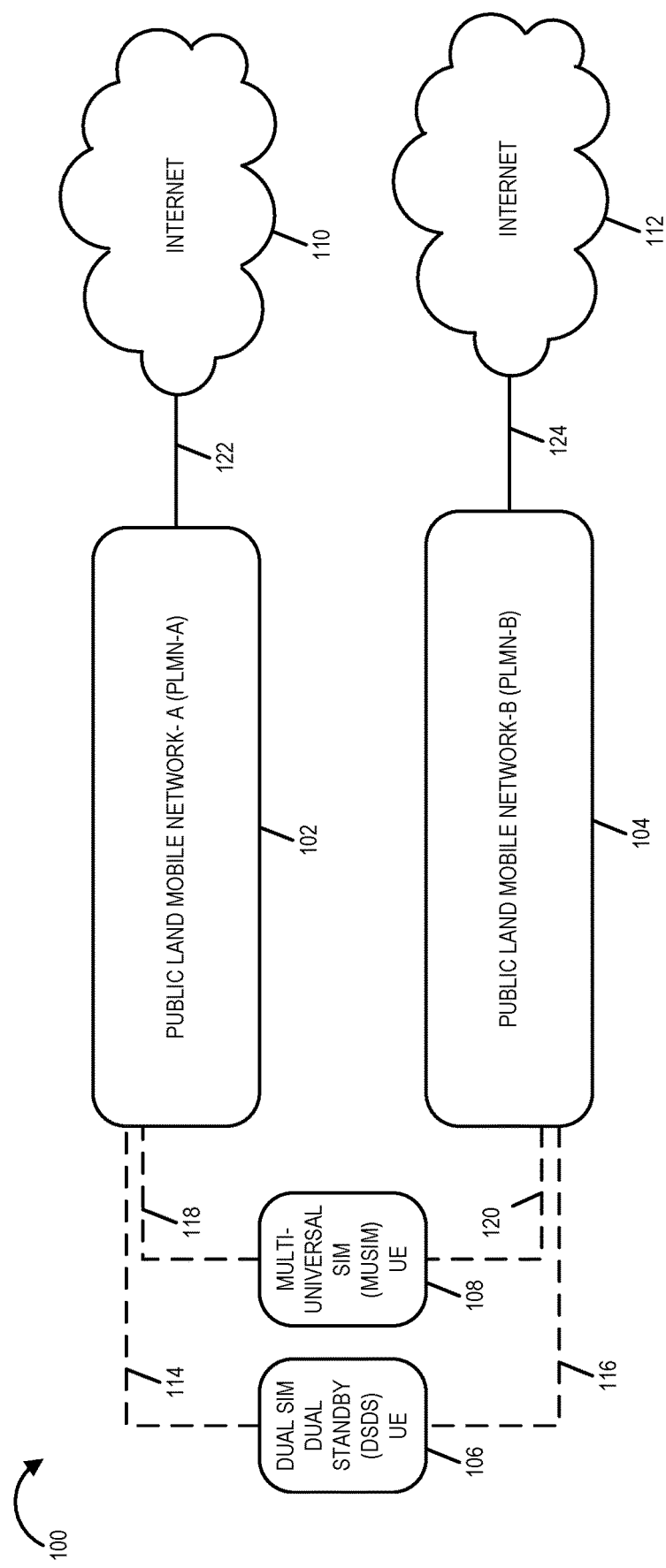
FIG. 1 is drawing of an exemplary communications system including Public Land Mobile Network A (PLMN-A), PLMN-B, a Dual SIM Dual Standby (DSDS) user equipment (UE) and a Multi-Universal SIM (MUSIM) UE 108 coupled together.

FIG. 1 is drawing of an exemplary communications system 100 including Public Land Mobile Network A (PLMN-A) 102, PLMN-B 104, a Dual SIM Dual Standby (DSDS) user equipment (UE) 106 and a Multi-Universal SIM (MUSIM) UE 108 coupled together. DSDS UE 106 is coupled to PLMN-A 102 via wireless communications link 114. MUSIM UE 108 is coupled to PLMN-A 102 via wireless communications link 118. PLMN-A 102 is coupled to Internet portion 110 via communications link 122. DSDS UE 104 is coupled to PLMN-A 102 via wireless communications link 116. MUSIM UE 108 is coupled to PLMN-B 104 via wireless communications link 120. PLMN-B 104 is coupled to Internet portion 112 via communications link 124.

The 3rd Generation Partnership Project (3GPP) is studying how a Multi-Universal Subscriber Identity Module (Multi-USIM) (MUSIM) device (in Technical Report TR 23.761), that has concurrent registration over 3GPP Radio Access Technology (RAT) associated with multiple USIMs, will be able to overcome the issues that are caused by standard Dual Subscriber Identity Module (SIM) Dual Standby (DSDS) user equipment (UE) today. Issues relating to a DSDS UE autonomously leaving or releasing the Radio Resource Control (RRC) connection with one of the systems (e.g., Public Land Mobile Network-A (PLMN-A)) due to engaging a service in another system (e.g., PLMN-B) are of interest and are under study. This autonomous leaving or releasing the RRC connection with PLMN-A, by a DSDS UE is likely to be interpreted as an error case by PLMN-A and has the potential to distort the statistics in the PLMN-A system. Paging resources of PLMN-A are wasted, if unnecessary re-paging is triggered by PLMN-A.

Figure 2:
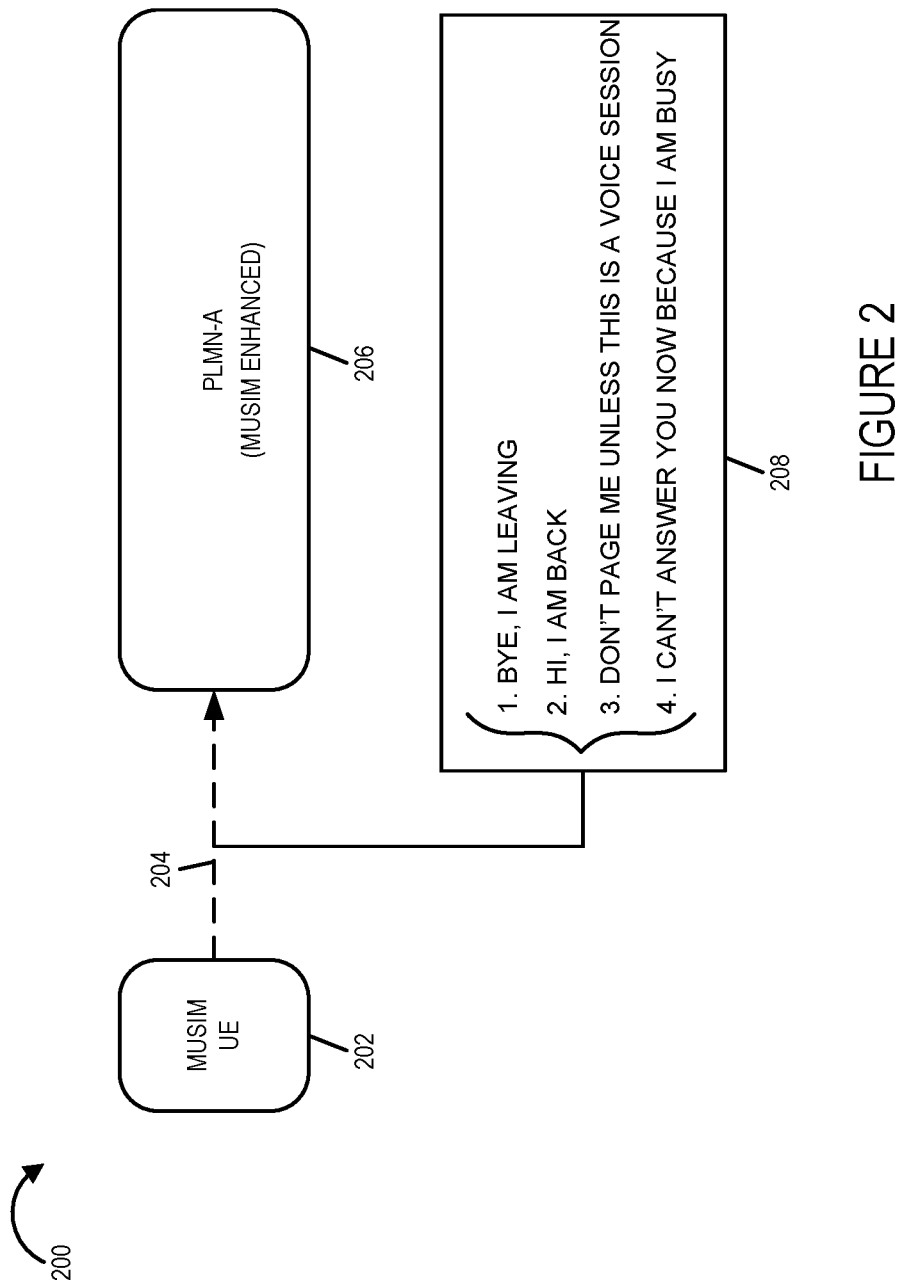
FIG. 2 is a drawing which illustrates interactions with PLMN-A for MUSIM operation.

Instead of having the MUSIM UE use the DSDS UE approach of having a UE autonomously leave PLMN-A, 3GPPP is considering to develop the following new interactions for a MUSIM UE with regard to leaving PLMN-A. (See FIG. 2.) Drawing 200 of FIG. 2 illustrates new interactions with PLMN-A for MUSIM operation. MUSIM UE 202 sends signal 204 to PLMN-A 206 communicating information 208 communicating one or more of: 1) "Bye, I am leaving", 2) "Hi, I'm back", 3) "Don't page me unless this is a voice session", or 4) "I can't answer you now because I am Busy". This approach allows the UE to leave and come back to PLMN-A in a graceful manner. This approach can also save paging resources from PLMN-A toward the MUSIM UE, when PLMN-A knows that the MUSIM UE is busy engaging with PLMN-B, and thus re-paging need not be performed.

MUSIM is an optional feature which means that in certain deployment scenarios, it is possible that only one of the two PLMN's (PLMN-A or PLMN-B) is enhanced with the MUSIM feature. For the PLMN that has not been upgraded to support the MUSIM feature (e.g., PLMN-A) the same issues experienced with a current DSDS UE is expected to be experienced with a MUSIM UE (e.g., bad key performance indicator (KPI) and wasted paging resources). In some service provider small cell/macro deployment scenarios, one possibility is that both PLMNs (PLMN-A and PLMN-B) will deploy this MUSIM feature (of FIG. 2) so an MUSIM UE can leave/resume connection to each PLMN gracefully and each network (PLMN-A and PLMN-B) will not have to deal with bad KPI and wasting of paging resources issues, as is the case with a DSDS UE. The methods described herein can be and sometimes are used to reduce or minimize disruption in communication between a MUSIM UE and two access networks with different PLMNs, only one of which has enhanced MUSIM capabilities. The methods can i) help to avoid unnecessary handovers, ii) provide end to end throughput enhancement and/or iii) help to minimize connection loss due Radio Link Failures (RLF).

Figure 3:
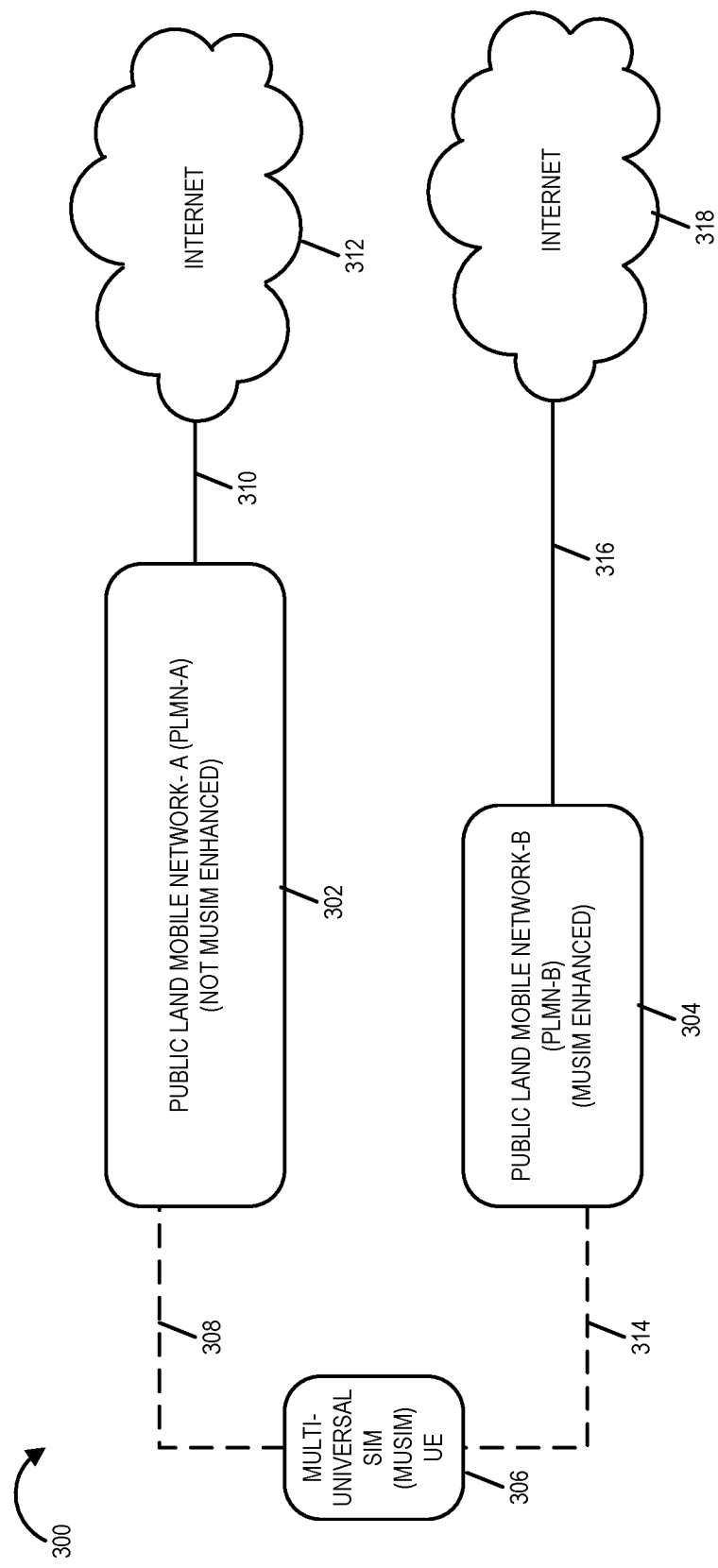
FIG. 3 is a drawing which illustrates an exemplary communications system in which a first PLMN, which is PLMN-A, is not MUSIM enhanced, while a second PLMN, which is PLMN-B, is MUSIM enhanced, and an exemplary MUSIM UE supports communications via both of the PLMNs.

In some scenarios, only one of the two service provider PLMNs is enhanced to support the MUSIM feature (of FIG. 2). FIG. 3 is a drawing which illustrates an exemplary communications system 300 in which a first PLMN, which is PLMN-A 302, is not MUSIM enhanced, while a second PLMN, which is PLMN-B 304, is MUSIM enhanced. System 300 also includes exemplary MUSIM UE 306. MUSIM UE 306 is coupled to PLMN-A 302 via wireless communications link 308. PLMN-A 302 is coupled via communications link 310 to Internet portion 312. MUSIM UE 306 is coupled to PLMN-B 304 via wireless communications link 314. PLMN-B 304 is coupled via communications link 316 to Internet portion 318.

When only one of the two PLMNs is enhanced with the MUSIM feature, it is possible to define a network architecture and procedure between the MUSIM UE and the MUSIM enhanced network (i.e PLMN-B) to mitigate the issues (e.g., wasting paging resources, unintentionally skewed KPIs) experienced by the non-enhanced MUSIM network (i.e., PLMN-A). Various exemplary methods and apparatus, in accordance with the present invention, are directed to a solution on how to mitigate undesirable issues (e.g., wasting paging resources, inappropriate KIPs) that would otherwise be experienced by a non-MUSIM network (i.e., PLMN-A), while one side of the MUSIM is connected to a MUSIM enhanced network (i.e., PLMN-B), if features of the present invention were not present.

Various features of some embodiments of the present invention, are based on the idea of controlling the downlink (DL) data flow toward the non MUSIM enhanced network (e.g., PLMN-A) based on the interaction between the MUSIM UE and the MUSIM enhanced network (e.g., PLMN-B) together with a novel MultiPath (MP) Proxy node. When there is no more data to be transmitted between the UE and the network in PLMN-A, its RAN will release the UE from the radio access link as is normally done today.

Figure 4:
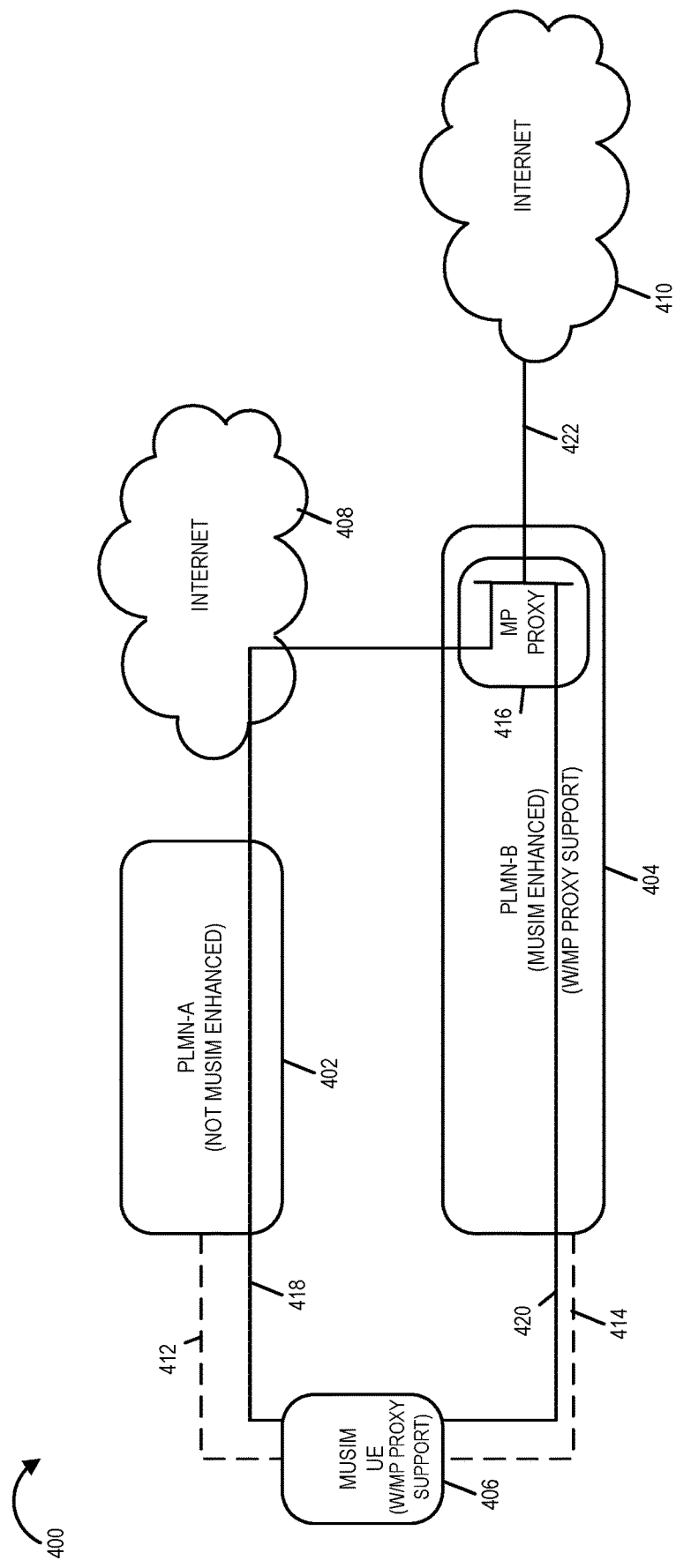
FIG. 4 illustrates an exemplary communications system, in accordance with some embodiments of the present invention, including a MUSIM UE, which is enhanced to support a Multi-Path (MP) Proxy feature, a first PLMN, which is not MUSIM enhanced, a second PLMN network which is MUSIM enhanced and further includes a MP proxy, and further illustrates exemplary user plane routing paths in accordance with the present invention.

FIG. 4 is a drawing 400 which shows user plane paths in accordance with an exemplary embodiment of the present invention. Drawing 400 illustrates exemplary MUSIM UE 406, exemplary PLMN-A 402, and exemplary PLMN-B 404 coupled together as shown. MUSIM UE 406 includes an MP proxy support enhancement feature in accordance with the present invention. MUSIM UE 406 is configured with the IP address of MP proxy 416, which is located in PLMN-B 404. PLMN-A 402 is not MUSIM enhanced. PLMN-B 404 is a MUSIM enhanced network, includes a Multi-Path (MP) proxy 416 and includes MP proxy support. MUSIUM UE 406 may, and sometimes does, have a wireless connection 412 with the RAN of PLMN-A 402. MUSEUM UE 406 may, and sometimes does has a wireless connection 414 with the RAN of PLMN-B 404.

In the exemplary system of drawing 400 of FIG. 4, user plane routing flows through the MP proxy 416 for both the PLMN-A network 402 and the PLMN-B network 404. A first user plane routing path includes path portion 418 from MUSIM UE 406 to MP proxy 416, which traverses PLMN-A 402 and Internet portion 408, and path portion 422 between MP proxy 416 and Internet portion 410. A second user plane routing path includes path portion 420 from MUSIM UE 406 to MP proxy 416 and path portion 422 between MP proxy 416 and Internet portion 410.

Figure 5:
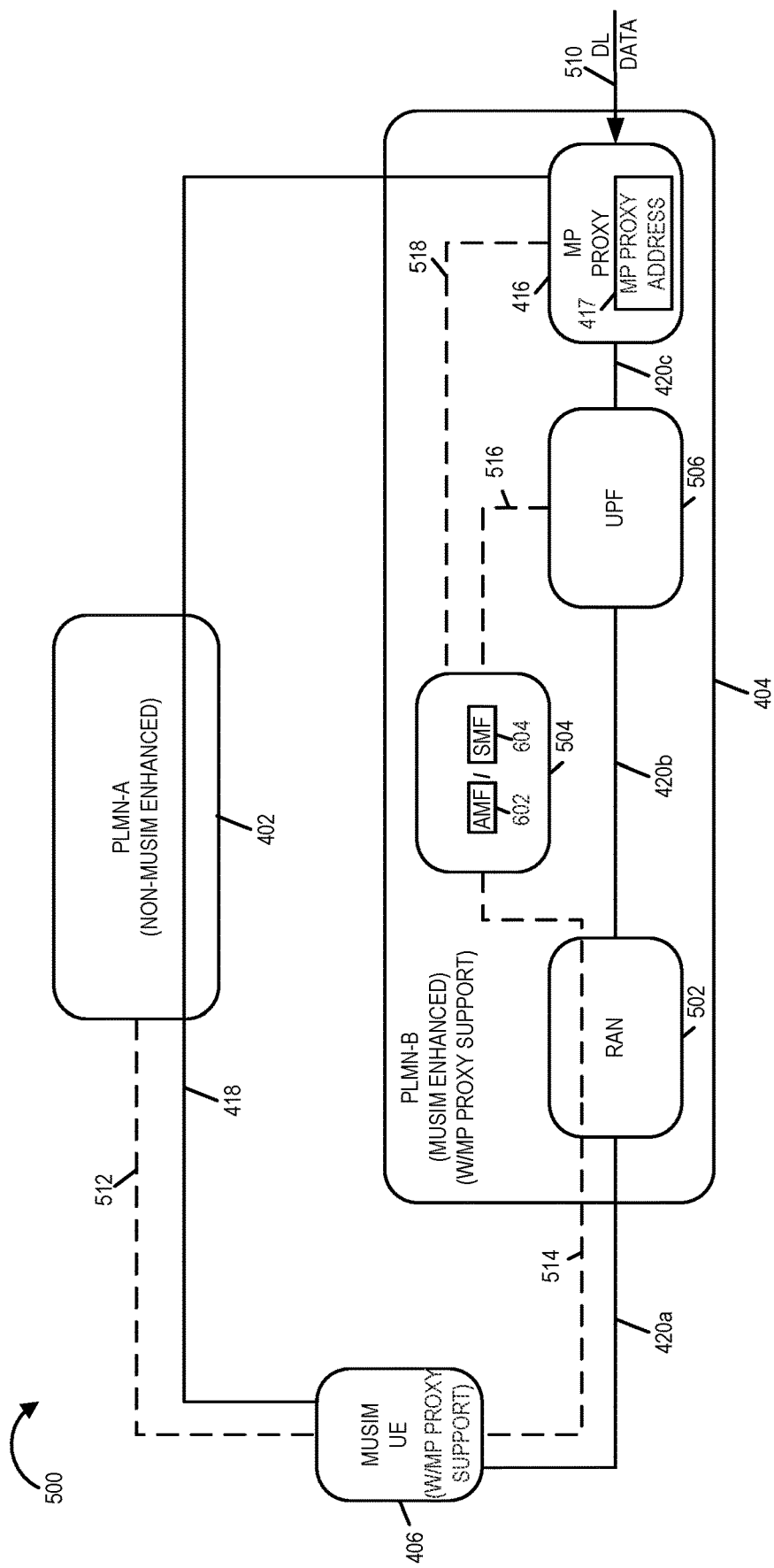
FIG. 5 is a drawing which illustrates exemplary components in the MUSIM enhanced PLMN of the exemplary system of FIG. 4 and further illustrates an exemplary 5G control plane for the MUSIM enhanced network including a new control interface between the session management function and the new MP proxy.
Figure 6A:
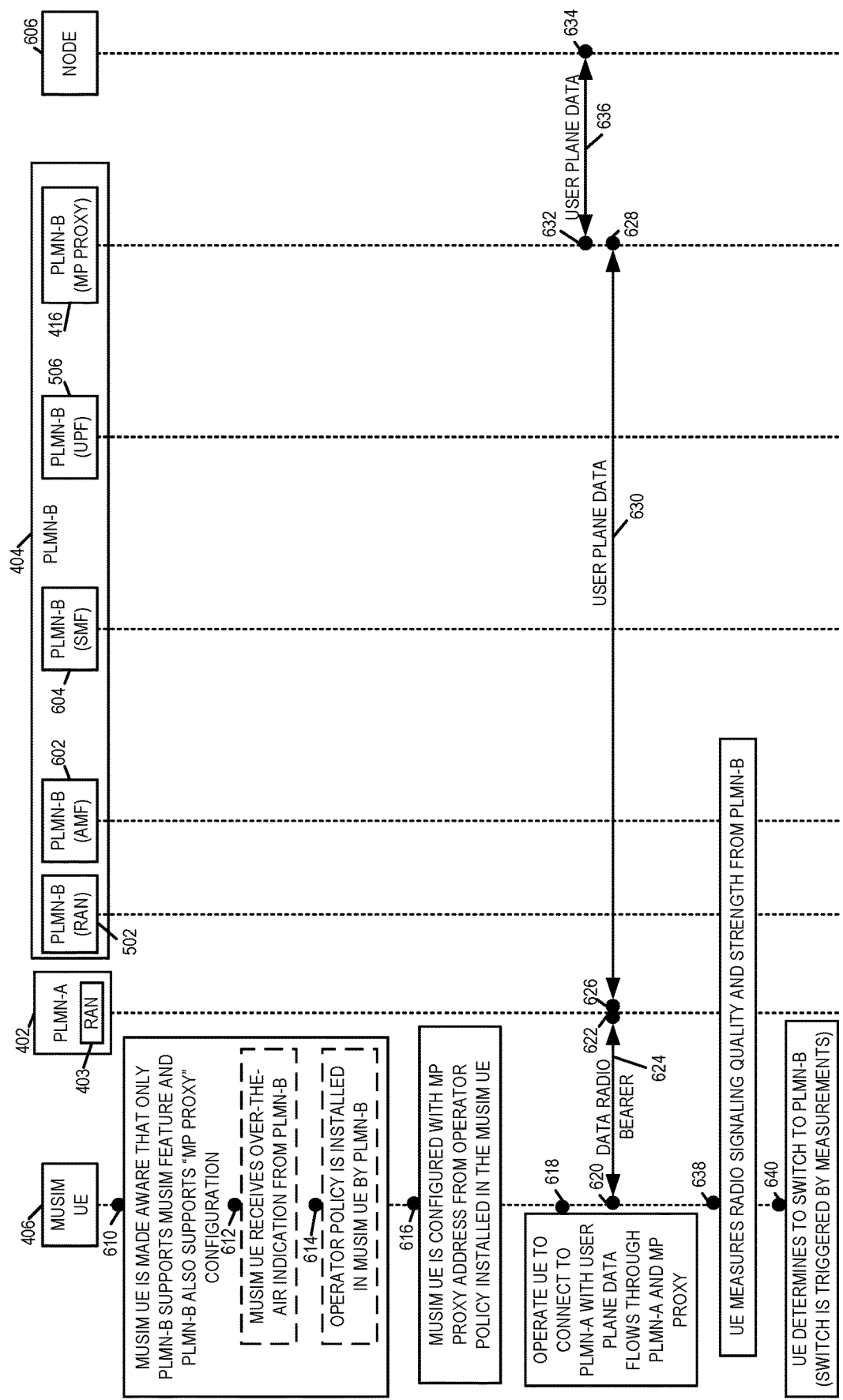
FIG. 6A is a first part of a drawing of an exemplary system and exemplary operations and signaling implementing an exemplary communications method in accordance with an exemplary embodiment.
Figure 6B:
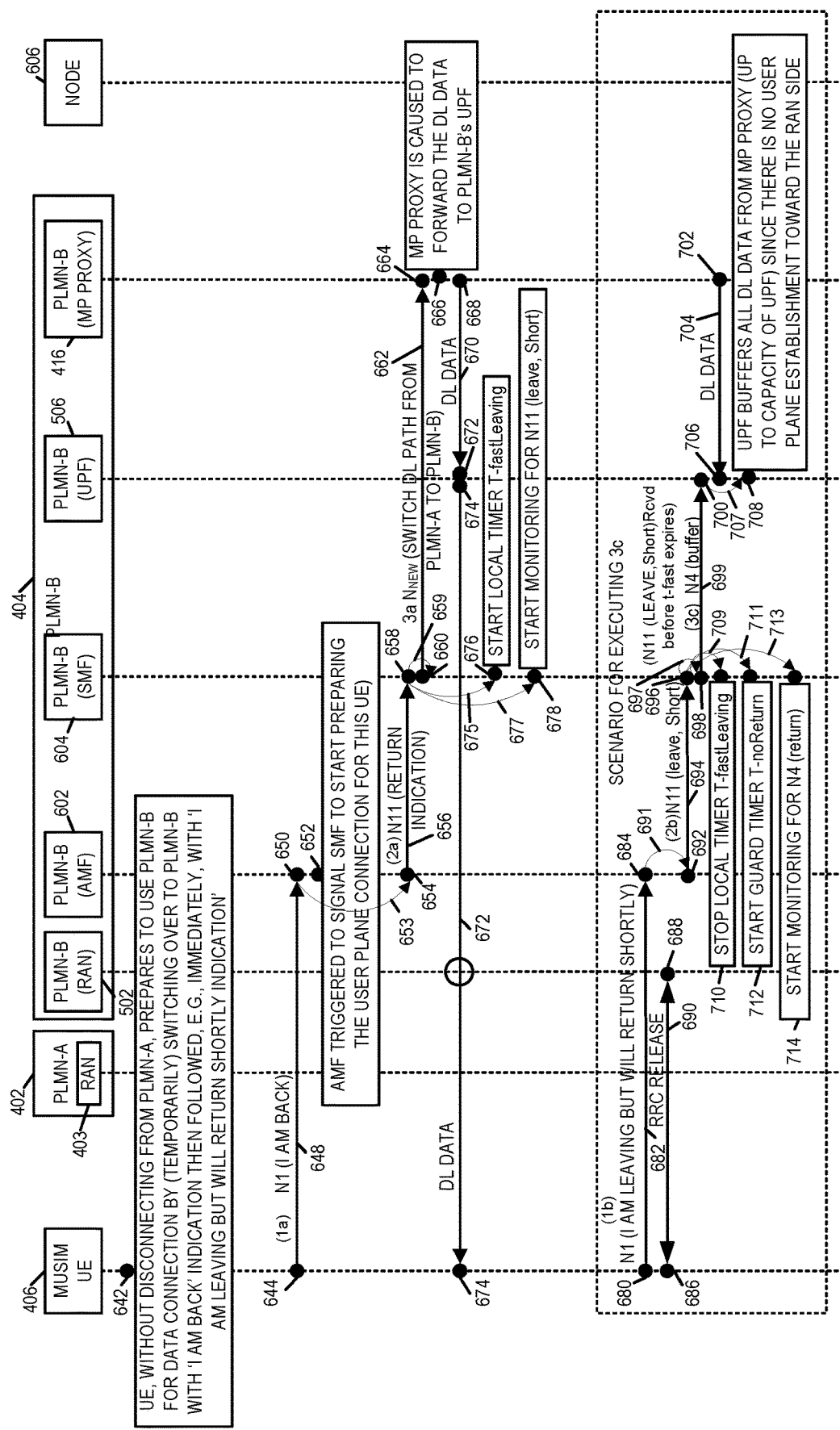
FIG. 6B is a second part of a drawing of an exemplary system and exemplary operations and signaling implementing an exemplary communications method in accordance with an exemplary embodiment.
Figure 6C:
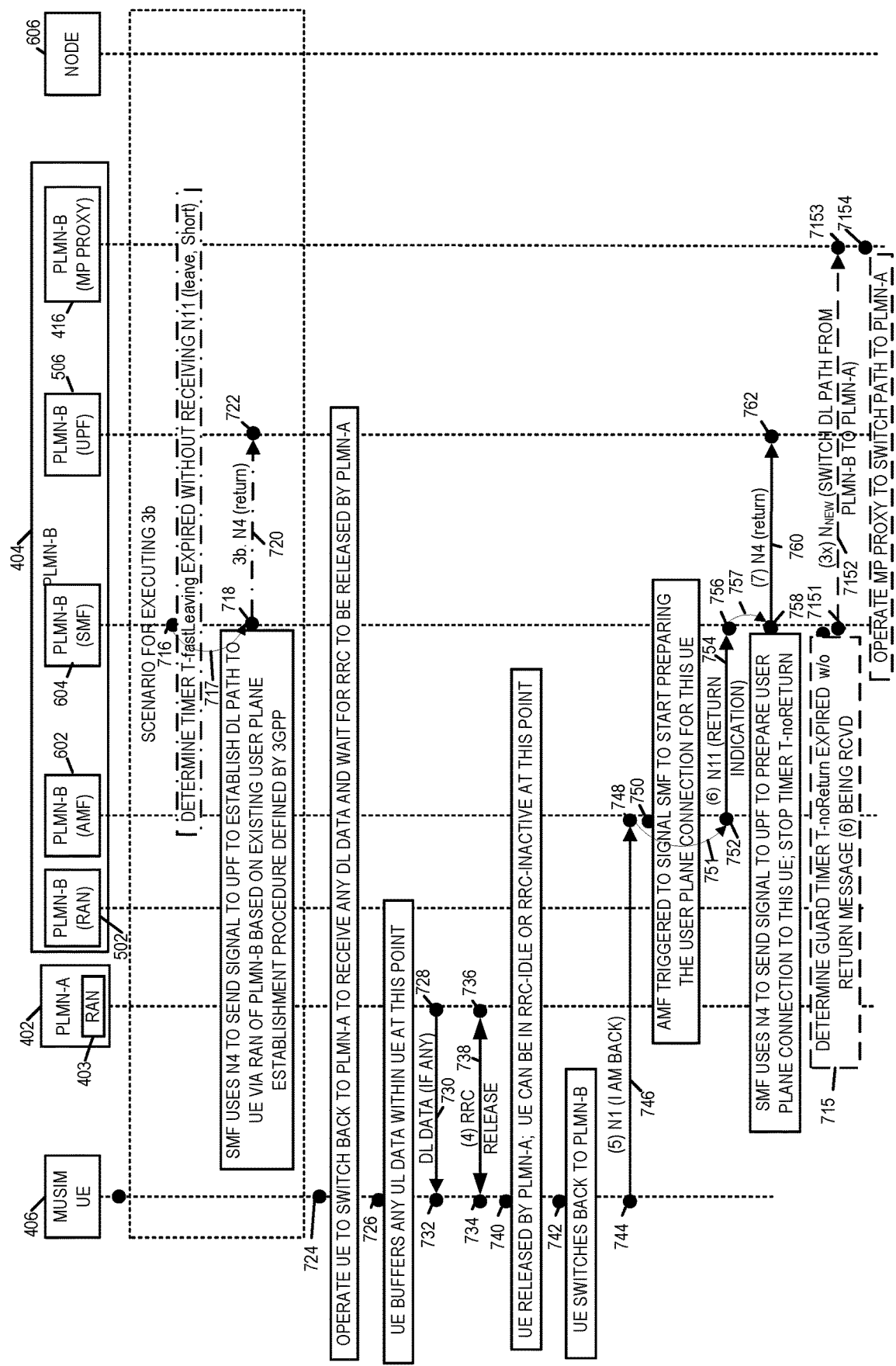
FIG. 6C is a third part of a drawing of an exemplary system and exemplary operations and signaling implementing an exemplary communications method in accordance with an exemplary embodiment.
Figure 6D:
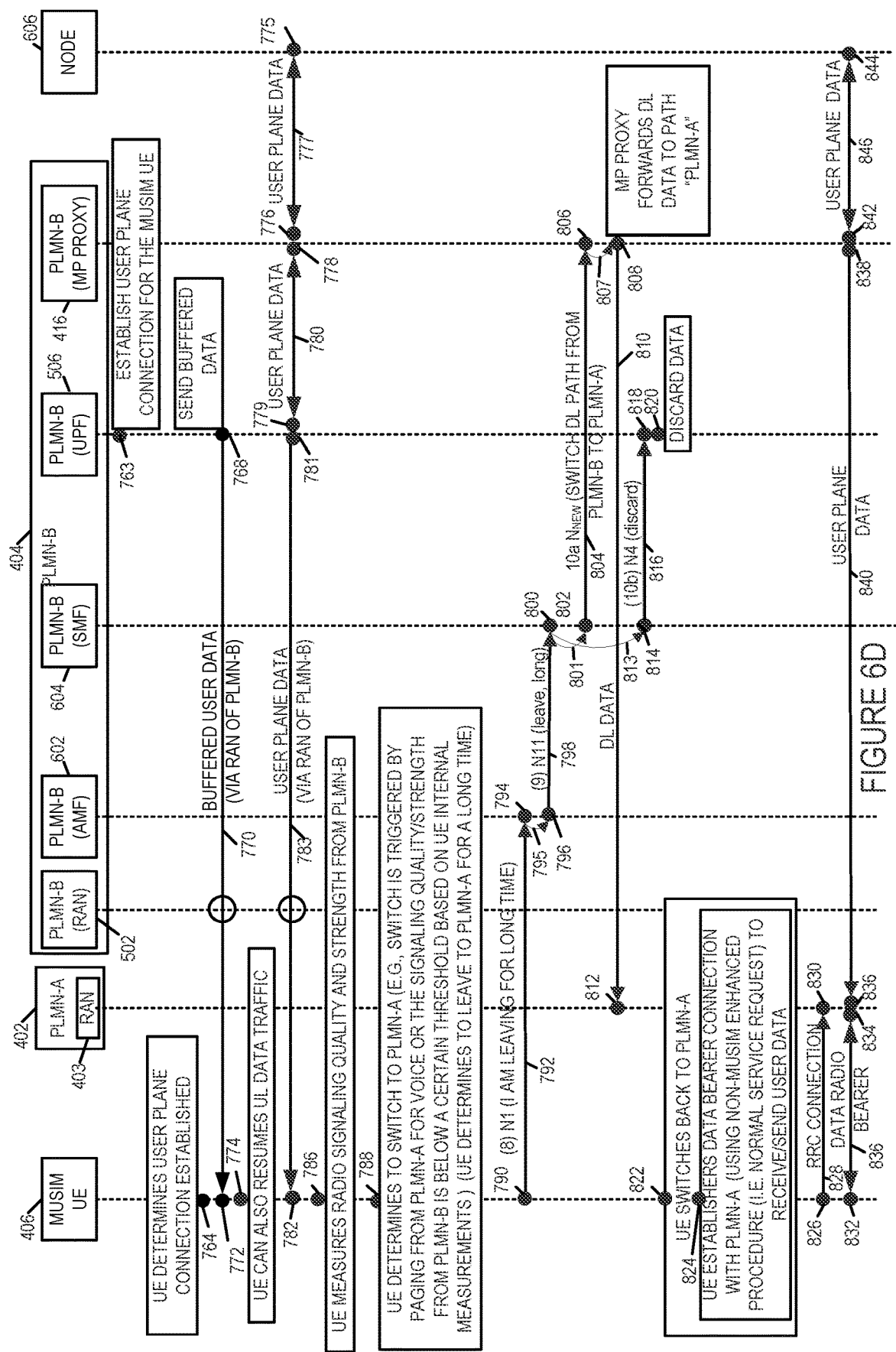
FIG. 6D is a fourth part of a drawing of an exemplary system and exemplary operations and signaling implementing an exemplary communications method in accordance with an exemplary embodiment.

FIG. 5 is a drawing 500 which shows exemplary network architecture with the 5G control plane to illustrate an exemplary realization in accordance with one embodiment of the present invention. Drawing 500 of FIG. 5 illustrates exemplary MUSIM UE 406, exemplary PLMN-A network 402 (non-MUSIM enhanced), and exemplary PLMN-B network 404 (MUSIM enhanced and included MP proxy feature), as shown in FIG. 4. PLMN-B 404 includes radio access network (RAN) 502, Access and Mobility Management Function/Session Management Function (AMF/SMF) 504, User Plane Function (UPF) and Multi-Path (MP) Proxy 416. User plane path portion 418, between MUSIM UE 406 an MP proxy 416 traverses PLMN-A 402. User plane path portion 420 (shown in FIG. 4), includes path portion 420a (between MUSIM UE 406 and RAN 502), path portion 420b (between RAN 502 and UPF 506), and path portion 420C (between UPF 506 and MP Proxy 416. Control signaling 512 flows between MUSIM UE 406 and PLMN-A 402. Control signaling 514 flows between MUSIM UE 406 and AMF/SMF 504, via RAN 502. Control signaling 516 flows between AMF/SMF 504 and UPF 506. Control signaling 518 flows between AMF/SMF 504 and MP Proxy 416. MP Proxy 416 is a new device and a new control interface is implemented and used for communicating with the MP proxy 416 (e.g., a new control interface for supporting new messages between the SMF and the MP proxy.

FIG. 6, comprising the combination of FIG. 6A, FIG. 6B, FIG. 6C and FIG. 6D, is a drawing of an exemplary system and exemplary signaling in accordance with an exemplary embodiment. The exemplary communications system includes MUSIM UE 406, PLMN-A 402, PLMN-B 404 and node 606. PLMN-A 402 includes radio access network (RAN) 403, e.g., a base station with a wireless interface, and a plurality of network nodes, e.g., core network nodes, routers, etc. PLMN-B 404 includes RAN 502, AMF 602, SMF 604, UPF 506 and MP Proxy 416. In some embodiments, AMF 602 and SMF 604 are part of AMF/SMF entity 504.

In step 610 MUSIM UE 406 is made aware that only PLMN-B supports MUSIM feature (e.g., PLMN-A 402 is not MUSIM enhanced while PLMN-B 404 is MUSIMN enhanced) and that PLMN-B also supports the "MP Proxy" configuration. In some embodiments, step 610 includes step 612, in which the MUSIM UE 406 receives an over-the-air indication from PLMN-B 404 indicating that PLMN-B 404 is MUSIM enhanced and includes the MP Proxy configuration. In some embodiments, step 610 includes step 614, in which operator policy is installed in the MUSIM UE 406 by PLMN-B.

In step 616, the MUSIM UE 406 is configured with the MP proxy address 417 from the operator policy installed in the MUSIM UE.

In step 618 the MUSIM UE 406 is operated to connect with PLMN-A with user plane data flows through PLMN-A 402 and through MP Proxy 416 of PLMN-B 404. MUSIM UE 406 and RAN 403 of PLMN-A 402 are operated in steps 620, 622, to communicated data over wireless connection 624. PLMN-A 402 and MP Proxy 416 of PLMN-B 404 are operated in steps 626, 628 to communicate user plane data over user plane data path portion 630. MP Proxy 416 of PLMN-B 404 and node 606, e.g., a node external to PLMN-B, e.g., a router, base station, server of or other UE device, are operated in steps 632, 634 to communicate data over user plane path portion 636.

In step 638 the MUSIM UE 406 measures radio signaling quality and strength from PLMN-B, e.g., based on received broadcast and/or downlink signals from RAN 502 of PLMN-B 404.

In step 640 the MUSIM UE 406 determines to switch to PLMN-B, with the switch to PLMN-B from PLMN-A being triggered by measurements of step 638 and measurements of ongoing signaling corresponding to the established connection with PLMN-A.

In step 642 MUSIM UE 406, without disconnecting with PLMN-A, prepares to use PLMN-B for data connection by (temporarily) switching over to PLMN-B with "I am back" indication the followed, e.g., immediately, with "I am leaving by will return shortly" indication.

In step 644, MUSIM UE 406 generates and sends, via an N1 interface, message 648 (labeled 1a), which indicates "I am back', to AMF 602 of PLMN-B 404. In step 650 the AMF 602 receives the "I am back" message 648. In response to the received "I am back" message 648, the AMF 602 is triggered to signal the SMF 604 to start preparing the user plane connection of UE 406. Thus, in step 654, AMF 602 generates and sends, via a N11 interface, return indication message 656 (labeled 2a) to SMF 604.

In step 658 SMF 604 receives return indication message 656. In step 660 the SMF 604 generates and sends, via a new N interface, message 662 (labeled 3a) indicating "Switch DL path from PLMN-A to PLMN-B", to MP Proxy 416. In step 664 the MP Proxy 416 receives the switch message 662. In step 666, in response to the received message 662, the MP Proxy 416 is caused to forward DL data, for MUSIM UE 406, to PLMN-Bs UPF 506. In step 668 MP proxy 416 sends DL data 670 to UPF 506. In step 672, UPF 506 receives DL data 670. In step 674, UPF 506 send DL data 672 to MUSIM UE 674 via RAN 502 of PLMN-B 404.

In step 676, in response to the received return indication message 656, the SMF 604 start a local timer, T-fastLeaving.

In step 678, in response to the received return indication message 656, the SMF 604 starts monitoring a N11 interface for a (leave, Short) message, indicating "I am leaving but will return shortly".

In step 680, MUSIM UE 406 generates and sends, via an N1 interface, message 682 (designated 1b) indicating "I am leaving but will return shortly", to AMF 684. In steps 688, and 686, AMF 602 and MUSIM UE 686, communicated RRC release signaling 690, resulting in an RRC release for the PLMN_B wireless connection.

In step 692, AMF 602, in response to received message 682, generates and sends, via an N11 interface, (leave, short) message 694 (designated 2b) to SMF 604.

In step 696, the (leave, short) message 694 is received, via N11 interface, by the SMF 604 before the T-fastLeaving timer (which was started in step 676) expires. In response to the reception of (leave, Short) message 694 before the T-fastLeaving timer expired, the SMF 604, in step 698 generates and sends, via an N4 interface, message 699 (designated 3c) indicating buffer, to the UPF 506. In step 706, UPF 506 receives buffer message 699. DL data 704 is sent by MP proxy 416 in step 702 and received by UPF 506 in step 706. In response to received buffer message 699, in step 708, the UPF 506 buffers all DL data from MP proxy 416 (up to the capacity of UPF) since there is no user plane establishment toward the RAN side.

In step 710, in response to received (leave, short) message 694, the SMF 604 stops the local timer T-fastLeaving. In step 712, in response to received (leave, short) message 694, the SMF 604 starts guard timer T-noReturn. In step 714, in response to received (leave, short) message 694, the SMF 604 starts monitoring, via an N4 interface, for a return indicator message.

In step 716, the SMF 604 determines that the timer, T-fastLeaving (which was started in step 676) has expired without receiving, via N11 interface, a (leave, Short) message (e.g., in this example, message 694 was not received.

In step 718, in response to the determination of step 716, the SMF 604 is operated to use N4 interface to send a signal to UPF 506 to establish DL path to MUSIM UE 406 via RAN 502 of PLMN-B based on existing user plane establishment procedure defined by 3GPP. Thus, in step 718 SMF 604, sends via N4 interface message 720 indicating return to the UPF 506. In step 722 UPF 506 receives return message 720 and establishes DL path to UE 406 via RAN 502 of PLMN-B.

In step 724, MUSIM UE 406 is operated to switch back to PLMN-A to receive any DL data and wait for RRC to be released by PLMN-A. In step 726, the UE 406 buffers and UL data within the UE 406. In step 728, PLMN-A 402, via its RAN 403, transmits any DL data 730, to MUSIM UE 406, which is received by the MUSIM UE 406 in step 732. In steps 734 and 736 the MUSIM UE 406 PLMN-A 402 communicate RRC release signals 738 (designated message (s) 4). In step 740 the MUSIM UE 406 is released by PLMN-A 402; the UE 406 can be in RRC-IDLE or RRC-INACTIVE state at this point in time. In step 742 the MUSIM UE 406 is operated to switch back to PLMN-B 404.

In step 744, the MUSIM UE 744 generates and sends, via N1 interface, message 746, indicating "I am back", to AMF 602. In step 748 the AMF 602 receives the I am back message 746. In step 750, the AMF 602 is triggered to signal SMF 604 to start preparing the user plane connection for UE 406. Thus, in step 752, the AMF 602 generates and sends, via N11 interface, return indication message 754 (designated message 6), to SMF 604. In step 756, the SMF 604 receives the return indicator message 754. In step 758 the SMF 604 uses N4 interface to signal to UPF 506 to prepare a user plane connection to MUSIM UE 406. Thus, in step 758, SMF 604 generates and sends, via NNEW interface, return message 760 (designated message 7) to UPF 506. In step 758 the SMF 604 also stops the timer T-noReturn. In step 762, the UPF 506 receives return indicator message 760. In step 763, UPF 506 is operated to establish a user plane connection for the MUSIM UE 406. In step 764 the MUSIM UE 406 determines that the user plane connection has been established via the RAN 502 of PLMN-B 404.

Alternately to the SMF 604 receiving the return indicator message 754 (designated message 6) in step 756 as described above, if the SMF 604 has not received return indicator message 754 (designated message 6), before the guard time timer T-noReturn expires, then step 715 is performed in which the SMF 604 determines that the guard time T-noReturn (which was started in step 712) has expired without a return message being received. In response to the determination of step 715 operation proceeds to step 7151, in which the SMF 604 generates and sends, via interface NNEW, message 7152 (designated message 3x) indicating that the DL path is to be switched from PLMN-B to PLMN-A, to MP proxy 416. In step 7153 the MP proxy 416 receives message 7152. In step 7152, in response to received message 7152, the MP proxy 416 is operated to switch the path to PLMN-A.

In step 768, the UPF 506 sends the buffered user data 780 (buffered in the UPF buffer—see step 708) to UE 406 via the RAN 502 of PLMN-B 404. In step 772, the MUSIM UE receives the buffered user data 770. In step 774 the UE 406 can also resume UL data traffic. Thus, now both UL and DL traffic can be communicated via the user plane path which traverses RAN 502 and UPF 506 of PLMN-B 404.

In steps 775 and 776 node 606 and MP Proxy 416 are operated to communicate user plane data 777. In steps 778 and 779 MP Proxy 416 and UPF 506 are operated to communicate user plane data 780. In steps 781 and 782 UPF 506 and MUSIM UE 406 are operated to communicate, via RAN 502 of PLMN-B 404 user plane data 783.

In step 786 MUSIM UE 406 measures radio signaling quality and strength from PLMN-B, e.g., from broadcast and DL signals from RAN 502 of PLMN-B 404. In step 788 MUSIM UE 406 determined to switch to PLMN-A 404. For example, the switch is triggered by paging from PLMN-A corresponding to voice communications (or other low latency requirement communications types) or the switch is triggered by the signaling quality/strength from PLMN-B being measured (by UE internal measurements) to be below a certain threshold, e.g., a minimum acceptable threshold for continuing to use PLMN-B.

In step 790, MUSIM UE 406 generates and sends, via N1 interface, message 792 indicating "I am leaving for a long time" (designated message 8), to AMF 602. In step 794, the AMF 602 receives the I am leaving for a long time message 792, and, in response, in step 796, generates and sends, via N11 interface, (leave, long) message 798 to SMF 604, which is received in step 802. In response to the received message 798, in step 802 the SMF 604 generates and sends, via a new interface, message 804 indicating "switch DL path from PLMN-B to PLMN-A" (designated message 10a), to MP proxy 416. In step 808 the MP proxy 416 is operated to start forwarding DL data for MUSIM UE 406 to the path for data PLMN-A. Thus, in step 808, the MP proxy 416 sends DL data 810 to the RAN 403 of PLMN-A 402.

In response to the SMF 604 receiving (leave, long) message 798, the SMF 604 also generates and sends, via N4 interface 816 a discard message 816 (designated message 10b) to the UPF 506. In step 818 the UPF 506 receives the discard message 816, and in response, in step 820 the UPF 506 discards any stored DL data intended for MUSIM UE 406, since the data path connection via the RAN 502 of PLMN-B 404 is not expected to be restored for a long time.

In step 822 the MUSIM UE 406 switches back to PLMN-A 402. Step 822 includes step 824 in which the MUSIM UE 406 establishes a data bearer connection with PLMN-A (using a non-MUSIM enhanced procedure (i.e., normal service request) to receive and send user data.

In step 826 MUSIM UE 406 generates and sends RRC connection request signal 828 to RAN 403 of PLMN-A 402. In step 830 RAN 403 receives the RRC connection request signals 828 and the PLMN-A 402 is operated to establish a data radio bearer connection 836 between MUSIM UE 406 and RAN 403 of PLMN-A 402. In step 832 and 834, the UE 406 and RAN 403 of PLMN-A 402 are operated to communicated user data. In step 836 and 838 PLMN-A 402 and the MP proxy 416 of PLMN-B 404 are operated to communicate user plane data for UE 406. In step 842 and 844, the MP proxy 416 and node 606 are operated to communicate user plane data for UE 406.

Arrow 653 is used to indicate that the reception of "I am back" message 648 by AMF 602 triggers the generation and sending of return indication message 656. Arrow 659 is used to indicate that the reception of "return indication" message 656 by SMF 604 triggers the generation and sending of "switch DL path from PLMN-A to PLMN-B" message 662. Arrow 675 is used to indicate that the reception of "return indication" message 656 by SMF 604 triggers the start of local timer, T-fastLeaving. Arrow 677 is used to indicate that the reception of "return indication" message 656 by SMF 604 triggers the start of monitoring N11 interface for a (leave, short) message. Arrow 691 is used to indicate that the reception of "I am leaving but will return shortly" message 682 by AMF 602 triggers the generation and sending of (leave, short) message 694. Arrow 697 is used to indicate that the reception of (leave, short) message 694 by SMF 604 triggers the generation and sending of buffer message 699. Arrow 707 is used to indicate that the reception of buffer message 706 triggers the UPF 506 to start buffering all DL data from MP proxy for UE 406. Arrow 709 is used to indicate that the reception of (leave, short) message 694 by SMF 604 triggers the stopping of the local timer, T-fastLeaving. Arrow 711 is used to indicate that the reception of (leave, short) message 694 by SMF 604 triggers the starting of guard timer, T-noReturn. Arrow 713 is used to indicate that the reception of (leave, short) message 694 by SMF 604 triggers the start of monitoring N4 interface for a return indicator message. Arrow 717 used to indicate that the determination of step 716 triggers the SMF 604 to generate and send return message 720. Arrow 751 is used to indicate that the reception of "I am back" message 746 by AMF 602 triggers the generation and sending of return indication message 754. Arrow 757 is used to indicate that the reception of return indication message 754 by SMF 604 trigger the generation and sending of return indication message 760. Arrow 795 is used to indicate that the reception of (I am leaving for a long time) message 792 by AMF 602 triggers the generation and sending of (leave, long) message 798. Arrow 801 is used to indicate that the reception of (leave, long) message 798 by SMF 604 triggers the generation and sending of "switch DL path from PLMN-B to PLMN-A" message 804. Arrow 813 is used to indicate that the reception of (leave, long) message 798 by SMF 604 triggers the SMF 604 to generate and send discard message 816 to UPF 506. Arrow 807 is used to indicate that the reception of "switch DL path from PLMN-B to PLMN-A" message 804 by MP proxy 416 triggers the MP proxy 416 to start forwarding DL data for UE 406 to the path which traverses PLMN-A.

Various aspects and/or features of some embodiments of the present invention are discussed below. Call flow related to the example of FIG. 6 will be described.

As an initial condition, MUSIM UE 406 is connected with PLMN-A 402 (via RAN 403) with user plane data flows through PLMN-A 402 and MP Proxy 416.

MUSIM UE 406 is preparing to use PLMN-B 404 for data connection by switching over to PLMN-B with "I am back" indication then followed, e.g., immediately, with "I am leaving but will return shortly" indication. (See block 642.) This can be, and sometimes is triggered based on the UE's internal measurements of radio signaling quality and strength from PLMN-B. (See step 640)

The UE 406 uses N1 signaling to AMF 602 to indicate "I am back". (See steps 644, 650, and message 648 (designated 1a).) This triggers the AMF 602 to signal to SMF (604) via N11 to start preparing the user plane connection to this UE 406. (See box 652, steps 654, 658, and message 656 (designated 2a).

The SMF 604 preparation includes performing step 660 and one of: step 698 or step 718. In step 660, SMF 604, via a new interface (NNEW), signals to MP Proxy 416 to start switching DL path from PLMN-A to PLMN-B. (See steps 660, 664 and message 662 (designated 3a). This causes the MP Proxy 416 to forward the DL data to PLMN-B's UPF 506. (See steps 666, 668 and 672, and DL data 670). In SMF 604 a local timer (T-fastLeaving) is started upon reception of message 656 (designated 2a) to wait for message 694 (designated 2b) (See steps 676, 678). Upon expiry of T-fastLeaving (see step 716), step 718 is executed (return indicator message 720 (designated 3b) is sent from SMF 604 to UPF 722. If (leave, short) message 694 (designated 2b) is received before T-fastLeaving expires (See step 696), then step 698 is executed (buffer message (designated 3c) is sent from SMF 604 to UPF 506), and T-fastLeaving is stopped (see step 710).

In step 718, SMF 604 uses N4 to signal UPF 506 to establish DL path to UE 406 via RAN 502 of PLMN-B 404 based on existing user plane establishment procedure defined by 3GPP (See steps 718, 720 and return message 720 (designated 3b)).

In step 698, SMF 604 uses N4 to signal UPF 506 to buffer any undelivered user data. (See steps 698, 700, and buffer message 699 (designated 3c)). In this case, all DL data from MP Proxy 416 is buffered (Up to capacity of the UPF 506) since there is no user plane establishment toward the RAN side. (See DL data 704 from MP proxy 416 to UPF 506, and step 708.) SMF 506 also starts a guard timer (T-noReturn) (See step 712). Upon expiry of T-noReturn (see step 715), SMF 502, in step 7151 sends message 7152 (designated 3x) to MP Proxy 416 to switch DL path back to PLMN-A 402. (See steps 715, 7151, 7153, and 7154 and switch path to PLMN-A message 7152 (designated 3x)). This is the case where UE 406 is staying in PLMN-A 404 due to whatever reasons. Alternatively, if return message 754 (designated message 6) is received before T-noReturn expires, then step 715 is not executed (switch path message 7152 (designated 3x) is not sent) and T-noReturn is stopped (see step 758).

In step 680 UE 406 uses N1 signaling to AMF 602 to indicate "I am leaving but will return shortly". (See steps 680, 684 and message 682 (designated 1b).) This triggers SMF 604 (via communicated (leave, short) message 694 (designated 2b)) to indicate to UPF 506 (via communicated buffer message 699 (designated 3c)) to buffer any undelivered DL user data. (See steps 692, 696, 698, 700, and 708 and messages 694 (designated 2b) and 699 (designated 3c)). RAN 502 also releases the UE 406 at this point (See steps 686, 688 and RRC release messages 690). UE 406 can be in RCRC-IDLE or RRC-INACTIVE state.

UE 406 may, and sometimes does, combine both "I am back" and "I am leaving" indications in a single signaling message to the network. Thus the "I am back" indication of message 648 (designated 1a) and the "I am leaving but will return shortly" indication of message 682 (designated 1b) may be, and sometimes are, communicated in a single message to AMF 602. In such a situation, this will trigger: step 654 (sending of return indicator message 656 (designated 2a), step 658, step 660 (sending of switch DL path from PLMN-A to PLMN-B indicator message 662 (designated 3a), step 664, step 666, step 668, step 692 (sending of leave, short indicator message 694 (designated 2b), step 696, step 698 (sending of buffer message 699 (designated 3c), step 700 and step 708.

In step 724 MUSIM UE 406 switches back to PLMN-A 402 to receive an DL data and wait for RRC to be released by PLMN-A 402. UE 406 will buffer an UL data within UE 406 at this point (See step 726).

In step 740 RRC is released by PLMN-A 402. (See RRC release message signaling exchanged between PLM (designated messages 4). UE 406 can be in RRC-IDLE or RRC-INACTIVE state at this point.

In step 742 MUSIM UE 406 switches back to PLMN-B 404.

In step 744 the UE 406 uses N1 signaling to AMF 602 to indicate "I am back". (See steps 744, 748 and message 746 (designated 5). This triggers the AMF 602 to send, in step 752, return indicator message 754 (designated message 6) via N11 to SMF 604 to notify the SMF 604 to start preparing the user plane connection to this UE 406. SMF 604 is aware that MP Proxy 416 is already sending DL traffic to PLMN-B via earlier message 662 (designated 3a), which was sent to the MP proxy 416, so there is not a need to switch the DL path to PLMN-B. SMF 604 sends, ins toe 758, return message 760 (designated 7) to signal to UPF 506 to prepare User Plane connection with this UE 406.

Once the user plane connection is established, the UE 406 can resume the UL data traffic. (See steps 764, 774.

MUSIM UE 406 is preparing to switch back to PLMN-A for data connection (long leaving). This may be due to paging from PLMN-A for voice or signaling quality/strength from PLMN-B is below certain threshold based on UE internal measurements. (See steps 786, 788, 790.)

In step 790, UE 406 uses N1 signaling to AMF 602 to indicate "I am leaving for long time". (See steps 790, 794, and message 792 (designated 8). AMF 602, in step 796 signals this indication to SMF 604 via (long, leave) indicator message 798 (designated 9). (See steps 796, 800 and message 798.) This triggers the SMF 604 to signal to MP Proxy 416 to forward the DL data to path "PLMN-A" (See steps 802m 806 and switch to path PLMN-A indicator message 804 (designed 10a). In step 814, the SMF 604 uses N4 to signal to UPF 506 to discard any DL data toward this UE 406 (See steps 814, 818 and discard indicator message 816 (designated 10b), and step 820).

In step 822 MUSIM UE 406 switches back to PLMN-A 402. In step 824 UE 406 establishes data bearer connection 836 with PLMN-A 402 to receive/send any user data.

Various aspects of some embodiments of the present invention are described below.

The MUSIM UE 406 is aware that only PLMN-B 404 supports MUSIM feature and it also supports "MP Proxy" configuration. This awareness can be done using over-the-air indication form PLMN-B or operator policy installed in the UE 406 by PLMN-B 404. The UE 406 is configured with the MP Proxy 416 address (417) from the operator policy installed in the UE 406.

When the UE 406 is connected with PLMN-A 402, DL data is forwarded to PLMN-A 402 by the "MP Proxy" 416. This can be, and in some embodiments is, achieved based on the policy rule from SMF 604 via "SMF-MPproxy" interface 518. For example, SMF 604 is aware that UE 406 is not connected with PLMN-B 404 based on event indication from AMF 602 and signals to "MP Proxy" 416 to switch the DL path to PLMN-A 402.

The MUSIM UE 406, without disconnecting from PLMN-A 402, temporarily switches over to PLMN-B 404 to indicate "Hi, I am back" and followed, e.g., immediately, by "Bye, I am leaving but will return shortly". This causes PLMN-B 404 to start switching the DL traffic, via "MP Proxy" 416 from path "PLMN-A" (418) to path "PLMN-B" (420). The SMF 604 uses "return shortly" as an indication to tell MP Proxy 416 via interface "SMF-MPproxy" (518) for the switching. SMF 604 also indicates to the UPF 506 to buffer the DL traffic if received. Because DL traffic is no longer being send via path (518) to PLMN-A 402, PLMN-A 402 will release the UE 406 shortly (e.g., within a few seconds) after the last DL packet is sent.

The MUSIM UE 406, after sending "leaving shortly" indication, to PLMN-B 404, will switch back to path 418 for PLMN-A 402 to receive the rest of the DL packets. The UE 406 will internally buffer any UL packet at this point. The UE 406 waits for PLMN-A 402 to release the RRC connection.

After switching to PLMN-B 404, the MUSIM UE 406 may need to switch back to PLMN-A 402. This may happen when the UE is picking up a Voice session in PLMN-A 402 or when the UE 406 detects that the coverage area of PLMN-B 404 is getting worst, e.g., signal quality and/or strength below predetermined threshold(s).

The MUSIM UE 406 is connected with PLMN-B 404 and indicates to PLMN_B 404 that "I am leaving for a long time". The SMF 604 uses "long indication" to tell MP Proxy 416, via "SMF-MPproxy" interface (518) for the switching the DL path to the path (418), which is for PLMN-A.

Alternatively, if the UPF 506 and MP Proxy 416 supports traffic measurements like Multipath Transmission Control Protocol (MPTCP), then MP Proxy 416 switching to path 418 can be, and sometimes is, based via protocol native measurement.

MUSIM UE 406 switches over to PLMN-A 402 and establishes connection using non-MUSIM enhanced procedures (i.e., normal service request).

In some embodiments, the "return shortly" indication from the UE 406 can be, and sometimes is, based on UE including paging filtering rule with "no filter". Whereas the "long indication" from the UE can be, and sometimes is, based on UE including paging filtering rule with filter set to a particular Data Network Name (DNN).

To cover the case for IDLE mode Mobility; i.e., when UE 406 is in RRC-IDLE/RRC-INACTIVE state but move in and out of PLMN-B 404, various options are possible.

In a first option, the UE 406 signals to PLMN-B 404 with N1 (I am leaving for a long time), as in step 780 of FIG. 6. This ensures that MP-Proxy 416 is steering traffic to the right PLMN at all times.

In a second option, "MP Proxy" 416 always tries PLMN-B 404 first. If a connection is not established due to UE 406 being unreachable, SMF 604 will receive unacknowledged for the DL data notification from AMF 602. SMF 604 then indicates to the MP Proxy 416 vis SMF-MPProxy interface 518 to forward DL data to PLMN-A 402.

In a third option, "MP Proxy" 416 employs a congestion control mechanism like congestion window used for TCP. As like MP-TCP, MP Proxy 416 will pick the path that is connect to the UE 406 for forwarding DL data as UE 406 can only be connected to one PLMN at a time.

Figure 7:
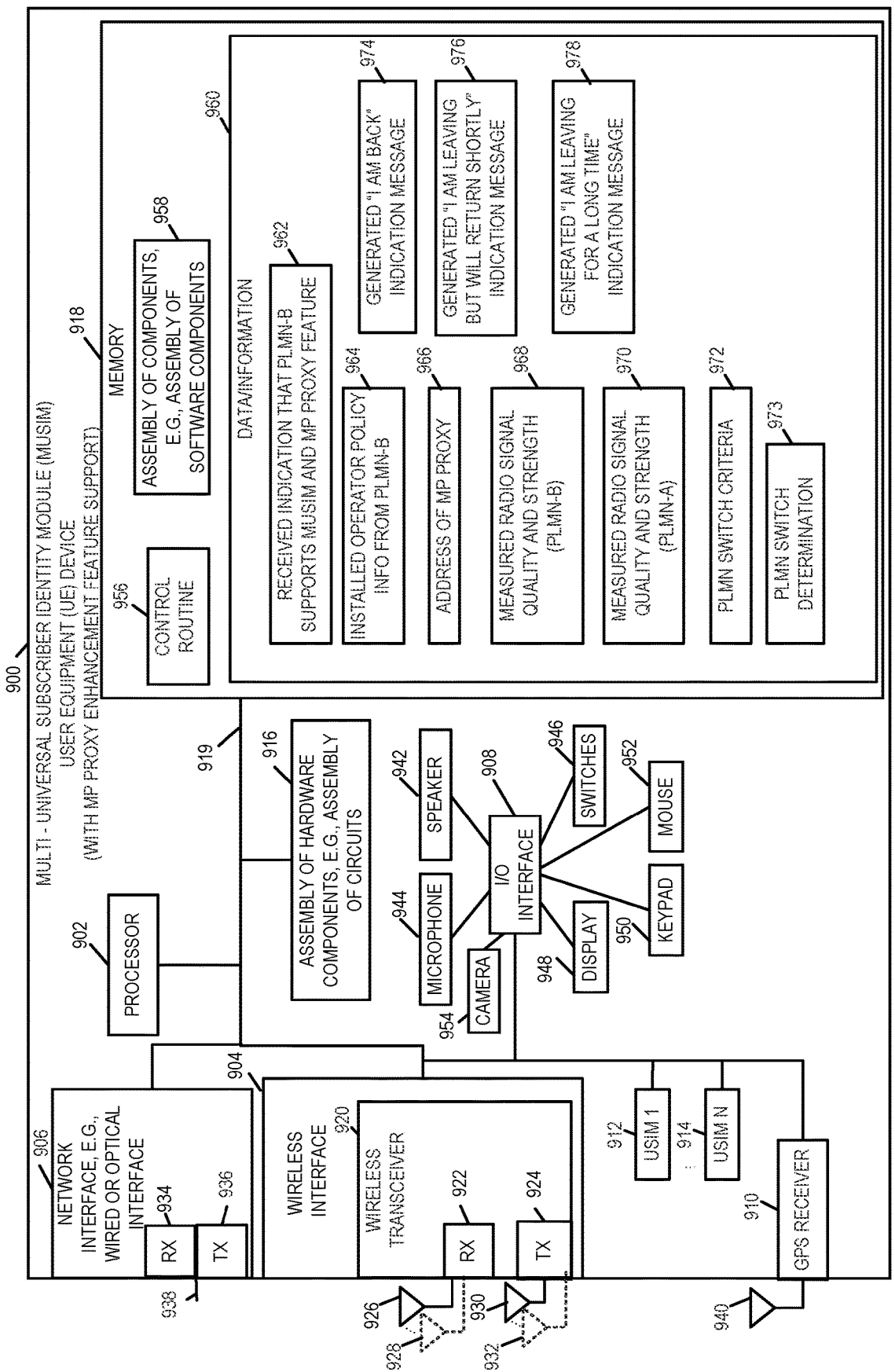
FIG. 7 is a drawing of an exemplary multi-universal subscriber identity module (MUSIM) user equipment (UE) device, supporting a multi-path (MP) proxy feature, in accordance with an exemplary embodiment.

FIG. 7 is a drawing of an exemplary multi-universal subscriber identity module (MUSIM) user equipment (UE) device 900, supporting a multi-path (MP) proxy feature, in accordance with an exemplary embodiment. Exemplary MUSIM UE device 900 is, e.g., MUSIM UE 406 of FIGS. 4, 5, and 6. Exemplary MUSIM UE 900 includes a processor 902, e.g., a CPU, a wireless interface 904, a network interface 906, an I/O interface 908, a GPS receiver 910, a plurality of USIMs (USIM 1 912, . . . , USIM N 914), an assembly of hardware components 916, and memory 918, coupled together via a bus 919 over which the various elements may interchange data and information.

Wireless interface 904 includes a wireless transceiver 920 including a wireless receiver 922 and wireless transmitter 924. Wireless receiver 922 is coupled to a one or more receive antennas (926, . . . 928) via which the MUSIM UE 900 receives wireless signals from a RAN, e.g., a wireless base station, of a PLMN. Wireless transmitter 924 is coupled to one or more transmit antennas (930, . . . 932) via which the MUSIM UE 900 transmits wireless signals to a RAN, e.g., a wireless base station, of a PLMN. In some embodiments, the same antennas are used for receive and transmit. In some embodiments, the wireless interface includes a plurality of different transceivers, receivers and/or transmitters, e.g., corresponding to different frequency bands, protocols, etc. which are supported.

Network interface 906, e.g., wired or optical interface, includes a receiver 934 and transmitter 936. The receiver 934 and transmitter 936 are coupled to connector 938, via which the MUSIM UE may be coupled to network nodes, a base station, or access point, e.g., when at a location, where a wired or optical connection is available.

In some embodiments USIM 1 912 corresponds to a first PLMN, e.g., a PLMN which is not MUSIM enhanced, and USIM N 914 corresponds to a second PLMN, e.g., a PLMN which is MUSIM enhanced and supports a MP Proxy feature in accordance with the present invention.

GPS receiver 910 is coupled to GPS antenna 940, via which the MUSIM UE 900 receives GPS signals, and the GPS receiver determines GPS information, e.g., latitude, longitude, altitude, and velocities, based on the received GPS signals.

MUSIM UE 900 further includes a plurality of input/output devices (speaker 942, microphone 944, switches 946, display 948, e.g., a touchscreen display, keypad 950, mouse 952, and camera 954), which are coupled to I/O interface 908, allowing the various I/O devices to communicate with other elements within MUSIM UE 900.

Memory 918 includes a control routine 956, an assembly of components 958, e.g., an assembly of software components, e.g., software applications, modules, routines, and/or subroutines, and data/information 960. In some embodiments, components in assembly of components 958 includes code which when executed, e.g., by processor 902, implement one or more steps of an exemplary method, e.g., steps of the method of FIG. 6 which are performed by MUSIM UE 406.

Data/information 960 includes a received indication that PLMN-B supports MUSIM and MP Proxy feature 962, installed operator policy information for PLMN-B 966, an address of MP Proxy 968, measured radio signal quality and strength information for PLMN-B 968, measured radio signal quality and strength information for PLMN-A 970, PLMN switch criteria 972, a PLMN switch determination 973, a generated "I am back" indication message, e.g., to be sent via N1 interface to the AMF of PLMN-B, a generated "I am leaving but will return shortly" indication message, e.g., to be sent via N1 interface to the AMF of PLMN-B, and a generated "I am leaving for a long time" indication message, e.g., to be sent via N1 interface to the AMF of PLMN-B.

Figure 8:
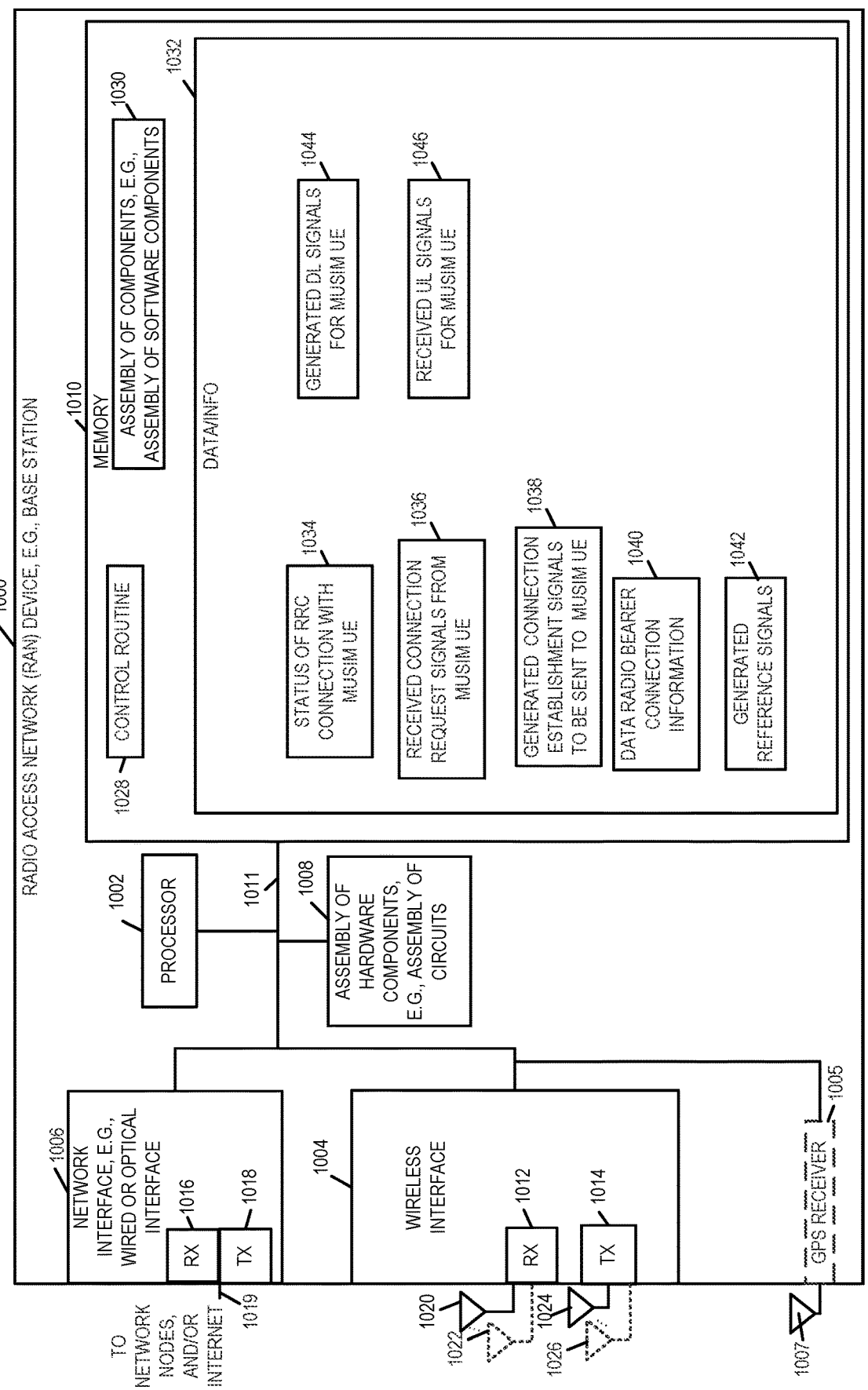
FIG. 8 is drawing of an exemplary radio access network (RAN) device, e.g., a base station, included in a PLMN, supporting MUSIM and a MP proxy feature, in accordance with an exemplary embodiment.

FIG. 8 is drawing of an exemplary radio access network (RAN) device 1000, e.g., a base station, included in a PLMN, supporting MUSIM and a MP proxy feature, in accordance with an exemplary embodiment. Exemplary RAN device 1000 is, e.g., exemplary RAN 502 shown in FIGS. 5 and 6. Exemplary RAN device 1000 includes a processor 1002, e.g., a CPU, a wireless interface 1004, a network interface 1006, optionally, a GPS receiver 1005, an assembly of hardware components 1008, e.g., an assembly of circuits, and memory 1010 coupled together via a bus 1011 over which the various elements may interchange data and information.

Wireless interface 1004 includes a wireless receiver 1012 and wireless transmitter 1014. Wireless receiver 1012 is coupled to a one or more receive antennas (1020, . . . 1022) via which the RAN device 1000 receives wireless signals from a UE, e.g., MUSIM UE 406. Wireless transmitter 1014 is coupled to one or more transmit antennas (1024, . . . , 1026) via which the RAN device 1000 transmits wireless signals to a UE, e.g., MUSIM UE 406. In some embodiments, the same antennas are used for receive and transmit. In some embodiments, the wireless interface includes a plurality of different transceivers, receivers and/or transmitters, e.g., corresponding to different frequency bands, protocols, etc. which are supported.

Network interface 1006, e.g., wired or optical interface, includes a receiver 1016 and transmitter 1018. The receiver 1016 and transmitter 1018 are coupled to connector 1019, via which the RAN device 1000 may be coupled to other network nodes, e.g., an AMF device and a UPF device, and/or the Internet.

GPS receiver 1005 is coupled to GPS antenna 1007, via which the RAN device 1000 receives GPS signals, and the GPS receiver 1005 determines GPS information, e.g., latitude, longitude, altitude, corresponding to RAN device 1000 based on the received GPS signals.

Memory 1028 includes a control routine 1028, an assembly of components 1030, e.g., an assembly of software components, e.g., software applications, modules, routines, and/or subroutines, and data/information 1032. In some embodiments, components in assembly of components 1030 include code which when executed, e.g., by processor 1002, implement one or more steps of an exemplary method, e.g., steps of the method of FIG. 6 which are performed by RAN 502.

Data/information 1032 includes status and/or state information regarding an RRC connection with a MUSIM UE 1034, received connection request signals from a MUSIM UE 1036, generated connection establishment signals to be sent to a MUSIM UE 1040, generated reference signals 1042 to be transmitted and to be used for measuring received signal strength and/or channel quality by a UE, data radio bearer connection information 1040, generated DL signals for a MUSIM UE 1044, e.g., to be transmitted to convey DL traffic data to the MUSIM UE, and received UL signals for a MUSIM UE 1046.

Figure 9:
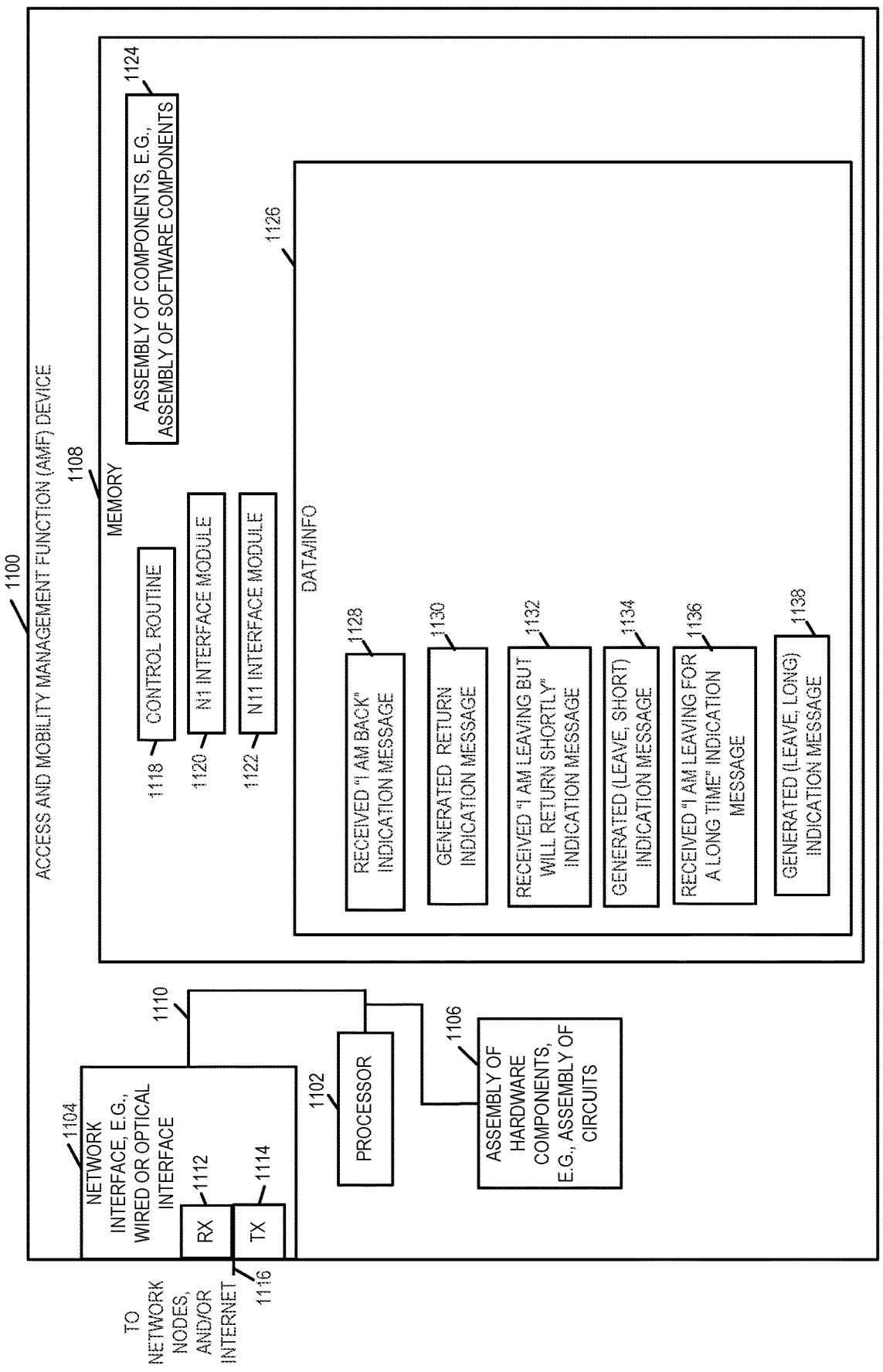
FIG. 9 is drawing of an exemplary access and mobility management function (AMF) device, included in a PLMN, supporting MUSIM and a MP proxy feature, in accordance with an exemplary embodiment.

FIG. 9 is drawing of an exemplary access and mobility management function (AMF) device 1100, included in a PLMN, supporting MUSIM and a MP proxy feature, in accordance with an exemplary embodiment. Exemplary AMF device 1100 is, e.g., AMF 602 of FIGS. 5 and 6.

Exemplary AMF device 1100 includes a processor 1102, e.g., a CPU, a network interface 1104, an assembly of hardware components 1106, e.g., an assembly of circuits, and memory 1108 coupled together via a bus 1110 over which the various elements may interchange data and information.

Network interface 1104, e.g., wired or optical interface, includes a receiver 1112 and transmitter 1114. The receiver 1112 and transmitter 1114 are coupled to connector 1116, via which the AMF device 1100 may be coupled to other network nodes, e.g., a RAN device and a SMF device, and/or the Internet.

Memory 1108 includes a control routine 1118, an N1 interface module 1120 for supporting control signaling with a UE, a N11 interface module for supporting control signaling with a SMF, an assembly of components 1124, e.g., an assembly of software components, e.g., software applications, modules, routines, and/or subroutines, and data/information 1126. In some embodiments, components in assembly of components 1124 include code which when executed, e.g., by processor 1102, implement one or more steps of an exemplary method, e.g., steps of the method of FIG. 6 which are performed by AMF 602.

Data/information 1126 includes a received "I am back" indication message 1128, e.g., received via N1 interface from MUSIM UE 406, a generated return indication message 1130, e.g., to be sent via N11 interface to SMF 604, a received "I am leaving but will return shortly" indication message 1132, e.g., received via N1 interface from MUSIM UE 406, and a generated (leave, short) indication message to be sent N11 interface to SMF 604. Data/information 1126 further includes a received "I am leaving for a long time" indication message 1136, e.g., received via N1 interface from MUSIM UE 406, and a generated (leave, long) indication message 1138, e.g., to be sent N11 interface to SMF 604.

Figure 10:
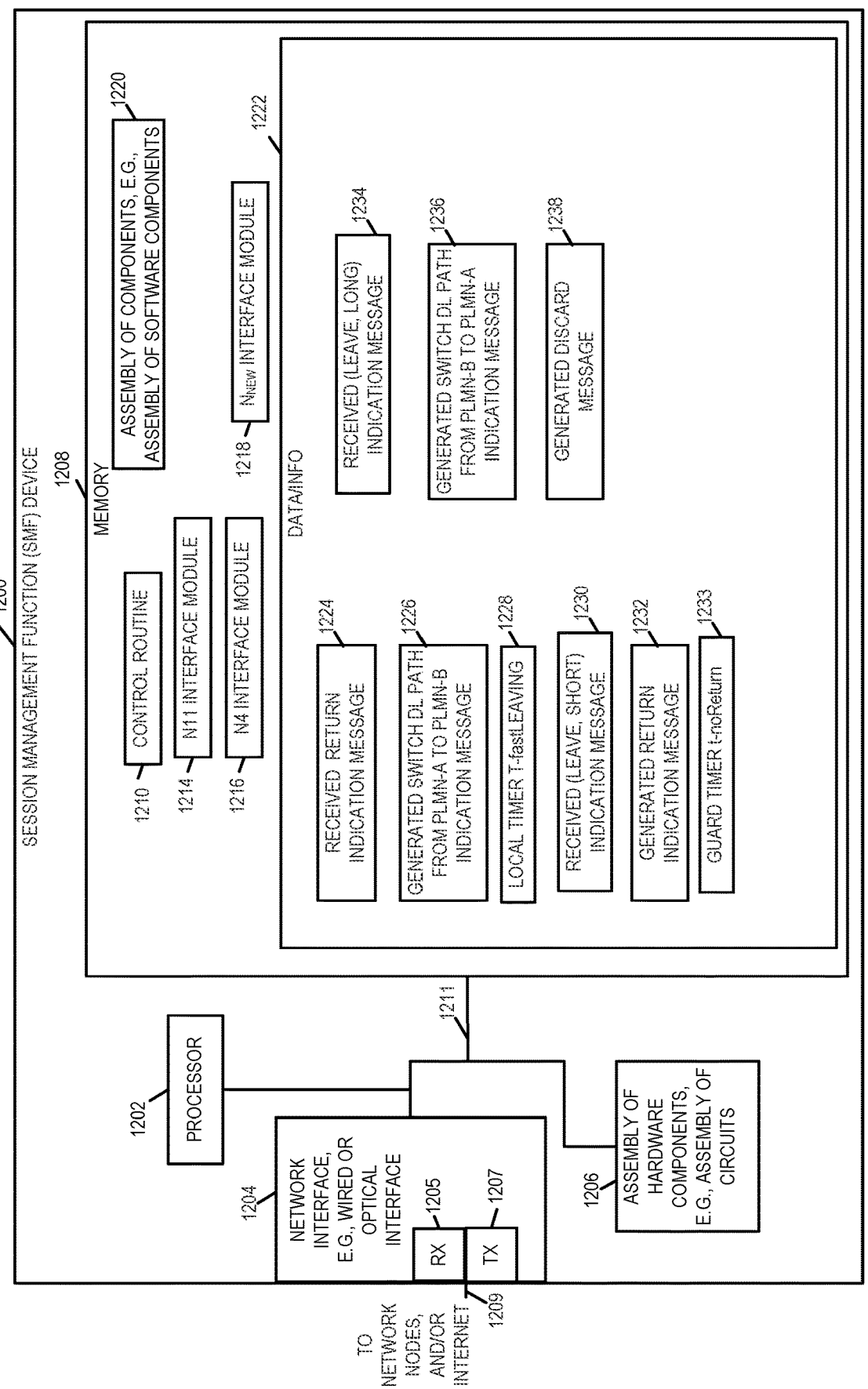
FIG. 10 is drawing of an exemplary session management function (SMF) device, included in a PLMN, supporting MUSIM and a MP proxy feature, in accordance with an exemplary embodiment.

FIG. 10 is drawing of an exemplary session management function (SMF) device 1200, included in a PLMN, supporting MUSIM and a MP proxy feature, in accordance with an exemplary embodiment. Exemplary SMF device 1200 is, e.g., SMF 604 of FIGS. 5 and 6.

Exemplary SMF device 1200 includes a processor 1202, e.g., a CPU, a network interface 1204, an assembly of hardware components 1206, e.g., an assembly of circuits, and memory 1208 coupled together via a bus 1211 over which the various elements may interchange data and information.

Network interface 1204, e.g., wired or optical interface, includes a receiver 1205 and transmitter 1207. The receiver 1205 and transmitter 1207 are coupled to connector 1209, via which the SMF device 1200 may be coupled to other network nodes, e.g., a AMF device, a UMF device, a MP Proxy device and/or the Internet.

Memory 1208 includes a control routine 1210, an N11 interface module 1214 for supporting control signaling with an AMF, a N4 interface module 1216 for supporting control signaling with a SMF, a NNEW interface module 1218 for supporting control signaling with a MP Proxy, and an assembly of components 1220, e.g., an assembly of software components, e.g., software applications, modules, routines, and/or subroutines, and data/information 1222. In some embodiments, components in assembly of components 1222 include code which when executed, e.g., by processor 1202, implement one or more steps of an exemplary method, e.g., steps of the method of FIG. 6 which are performed by SMF 604.

Data/information 1222 includes a received return indication message 1224, e.g., received via N11 interface from AMF 602, a generated switch downlink path from PLMN-A to PLMN-B indication message 1226, e.g., to be sent via NNEW interface to MP Proxy 416, a local timer T-fastLeaving 1228, a received (leave, short) indication message 1230, e.g., received via N11 interface from AMF 602, a generated return indication message 1232 to be sent N4 interface to UPF 506, and a guard timer T-noReturn 1233. Data/information 1222 further includes a received (leave, long) indication message 1234, e.g., received via N11 interface from AMF 602, and a generated discard indication message 1238, e.g., to be sent N4 interface to UPF 506.

Figure 11:
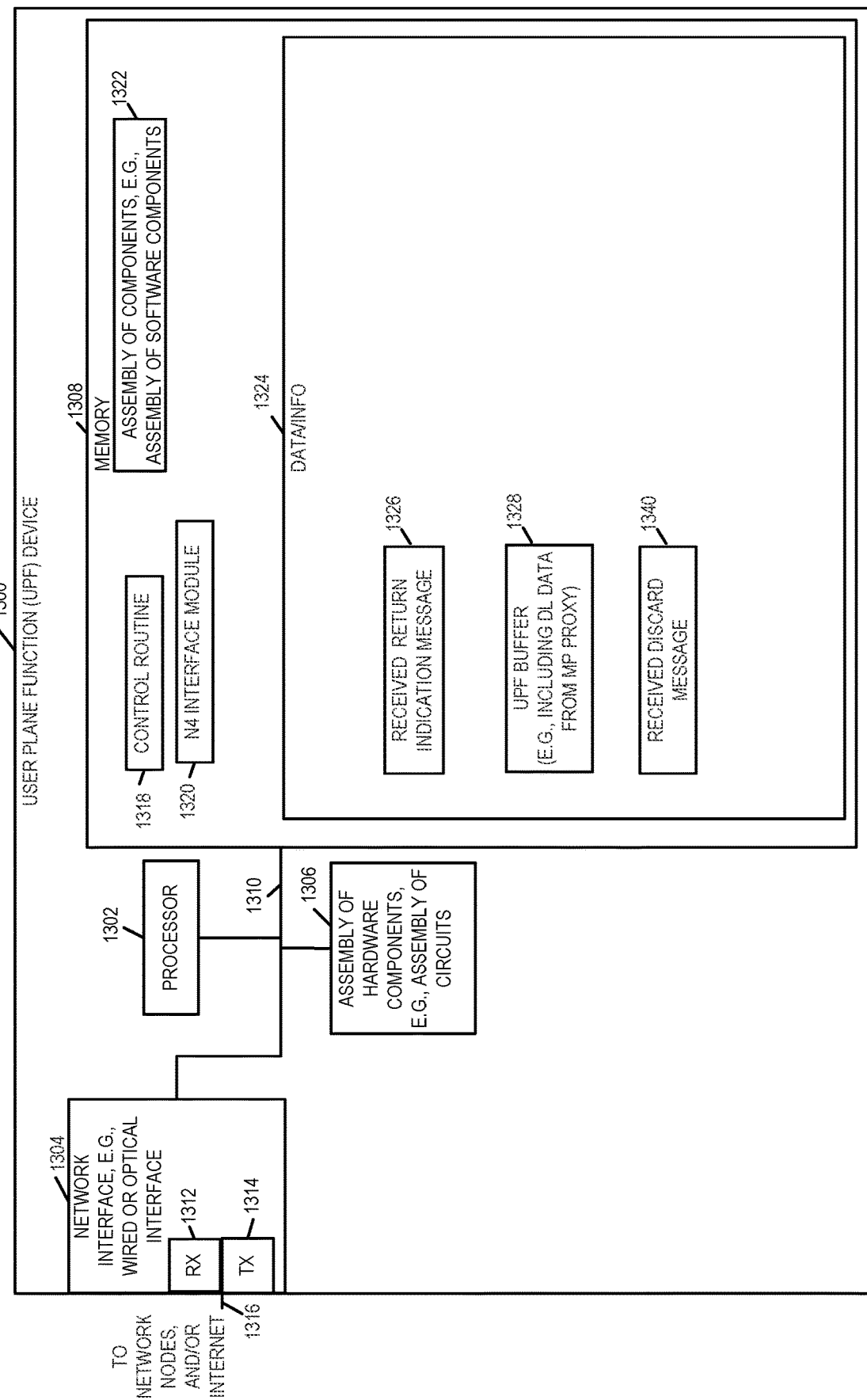
FIG. 11 is drawing of an exemplary user plane function (UPF) device, included in a PLMN, supporting MUSIM and a MP proxy feature, in accordance with an exemplary embodiment.

FIG. 11 is drawing of an exemplary user plane function (UPF) device 1300, included in a PLMN, supporting MUSIM and a MP proxy feature, in accordance with an exemplary embodiment. Exemplary UPF device 1300 is, e.g., UPF 506 of FIGS. 5 and 6.

Exemplary UPF device 1300 includes a processor 1302, e.g., a CPU, a network interface 1304, an assembly of hardware components 1306, e.g., an assembly of circuits, and memory 1308 coupled together via a bus 1310 over which the various elements may interchange data and information.

Network interface 1304, e.g., wired or optical interface, includes a receiver 1312 and transmitter 1314. The receiver 1312 and transmitter 1314 are coupled to connector 1316, via which the UPF device 1300 may be coupled to other network nodes, e.g., a SMF device, a MP Proxy device and/or the Internet.

Memory 1308 includes a control routine 1318, an N4 interface module 1320 for supporting control signaling with a SMF, and an assembly of components 1322, e.g., an assembly of software components, e.g., software applications, modules, routines, and/or subroutines, and data/information. In some embodiments, components in assembly of components 1322 include code which when executed, e.g., by processor 1202, implement one or more steps of an exemplary method, e.g., steps of the method of FIG. 6 which are performed by UPF 506.

Data/information 1324 includes a received return indication message 1326, e.g., received via N4 interface from SMF 604, a UPF buffer 1326, e.g., including DL from MP proxy which is being buffered, and a received discard indication message 1340.

Figure 12:
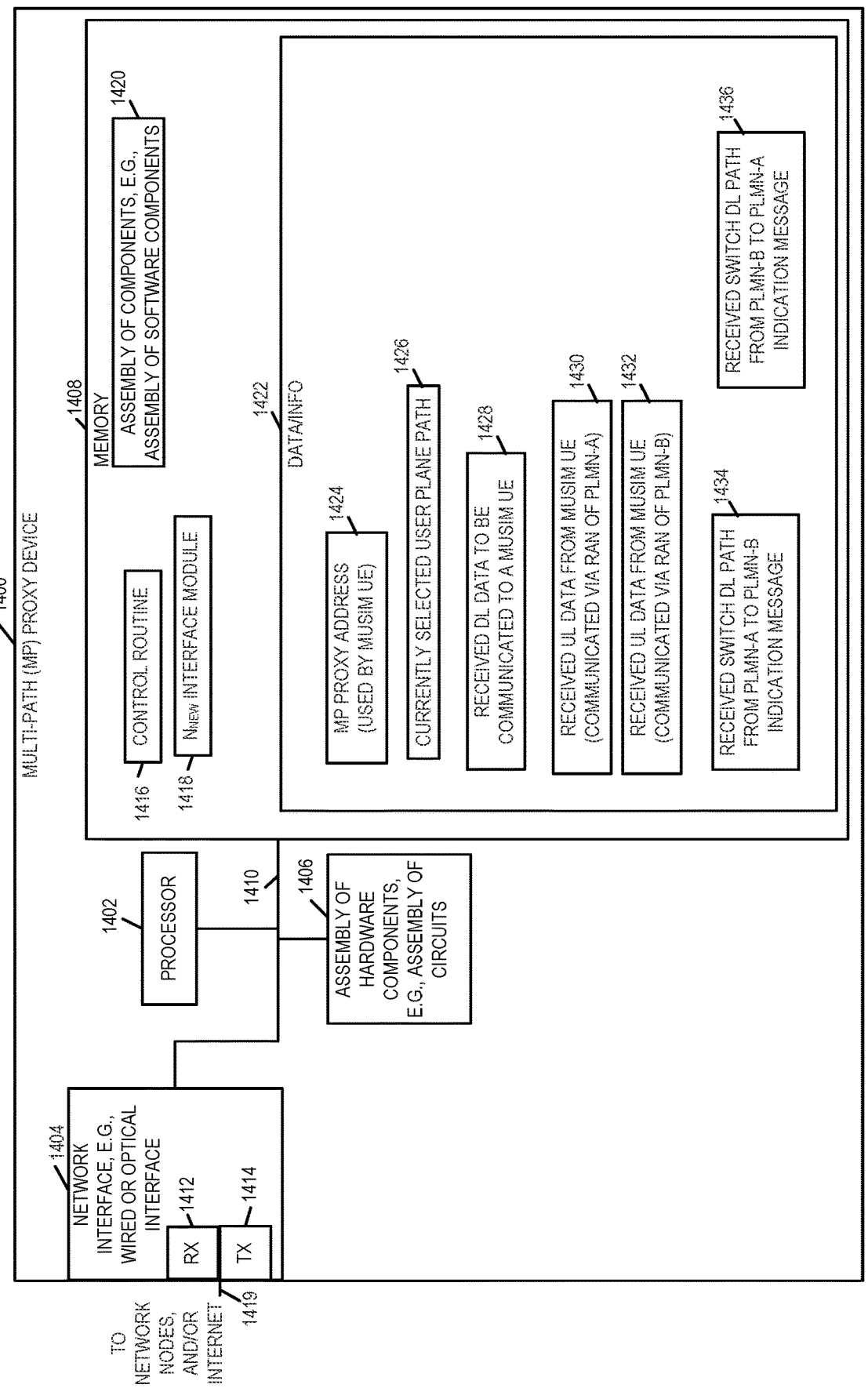
FIG. 12 is a drawing of a Multi-Path (MP) proxy device, included in a PLMN, supporting MUSIM and a MP proxy feature, in accordance with an exemplary embodiment.

FIG. 12 is a drawing of an exemplary Multi-Path (MP) proxy device 1400, included in a PLMN, supporting MUSIM and a MP proxy feature, in accordance with an exemplary embodiment. Exemplary MP proxy device 1400 is, e.g., MP proxy 416 of FIGS. 4, 5 and 6.

Exemplary MP Proxy device 1400 includes a processor 1402, e.g., a CPU, a network interface 1404, an assembly of hardware components 1406, e.g., an assembly of circuits, and memory 1408 coupled together via a bus 1410 over which the various elements may interchange data and information.

Network interface 1404, e.g., a wired or optical interface, includes a receiver 1412 and transmitter 1414. The receiver 1412 and transmitter 1414 are coupled to connector 1419, via which the MP Proxy device 1400 may be coupled to other network nodes, e.g., a SMF device, a UPF device, a node within PLMN-A and/or the Internet.

Memory 1408 includes a control routine 1416, an NNEW interface module 1320 for supporting control signaling with a SMF, and an assembly of components 1420, e.g., an assembly of software components, e.g., software applications, modules, routines, and/or subroutines, and data/information. In some embodiments, components in assembly of components 1422 include code which when executed, e.g., by processor 1402, implement one or more steps of an exemplary method, e.g., steps of the method of FIG. 6 which are performed by MP Proxy 416.

Data/information 1422 includes a MP Proxy address 1424 (e.g., used by MUSIM UE 406), a currently selected user plane path 1426 (e.g., one including RAN 402 of PLMN-A or one including RAN 502 of PLMN-B), received DL data to be communicated to a MUSIM UE 1428, received UL data from a MUSIM UE communicated via RAN of PLMN-A 1430, received UL data from the MUSIM UE communicated via RAN of PLMN-B 1432, a received switch path indication message 1434 indicating that the DL path is to be switched from PLMN-A to PLMN-B, and a received switch path indication message 1346 indicating that the DL path is to be switched from PLMN-B to PLMN-A.

Figure 13:
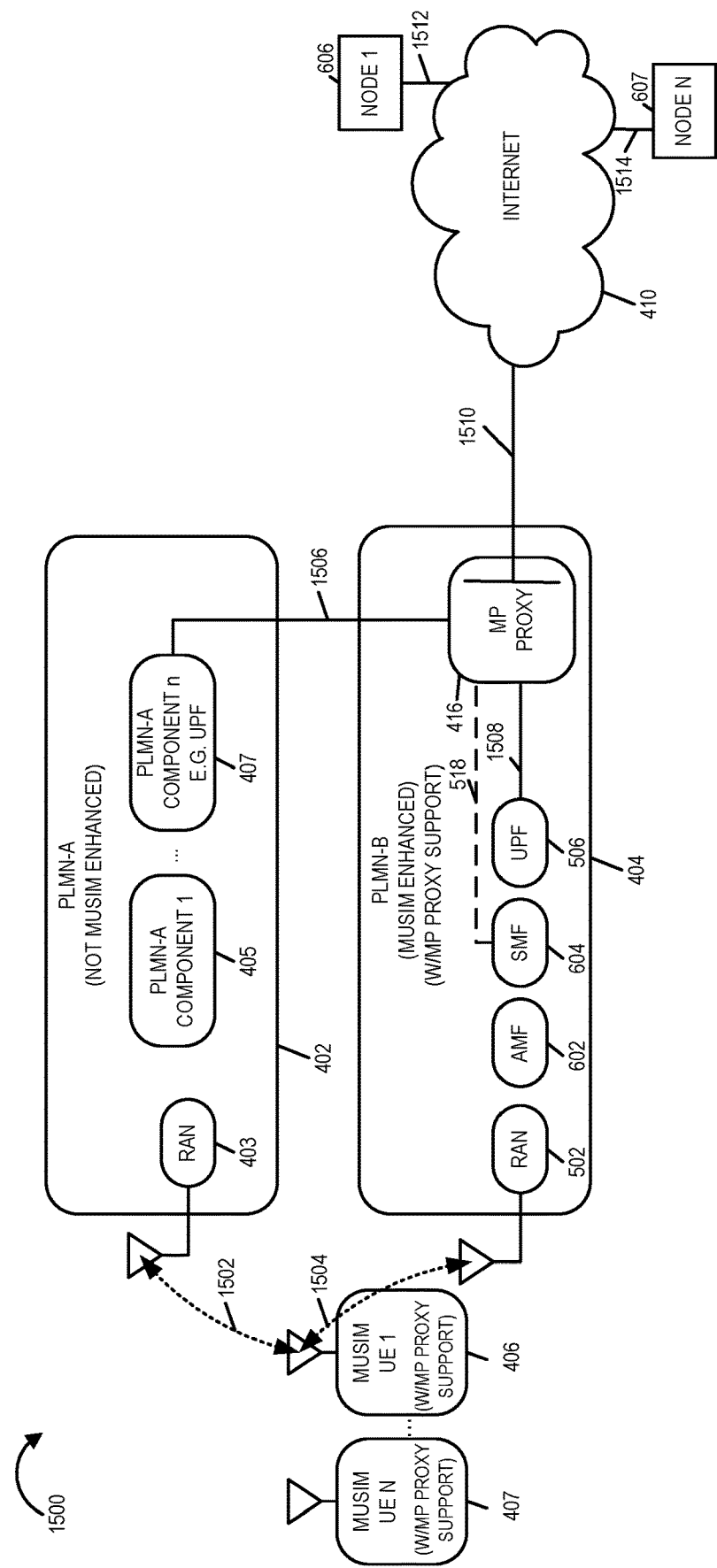
FIG. 13 is a drawing of an exemplary communications system in accordance with an exemplary embodiment.

FIG. 13 is a drawing of an exemplary communications system 1300 in accordance with an exemplary embodiment. Exemplary communications system 1300 includes various elements and components already shown in FIGS. 4, 5, and 6. Exemplary communications system 1300 includes first PLMN, PLMN-A 402, which is not MUSIM enhanced, and second PLMN network, PLMN-B 404, which is MUSIM enhanced and is further enhanced to support a MP Proxy feature. The two PLMNs (402, 404) are coupled together via communications link or path 1506, which may include a portion of the Internet and/or other nodes, e.g., routers. Exemplary communications system 1500 further includes a plurality of MUSIM UE devices, which support the MP Proxy feature (MUSIM UE 1 406, MUSIM UE N 407), Internet portion 410, and nodes, e.g., communications session end point nodes (node 1 606, . . . , node N 607). The MUSIM UEs (406, 407), may be, and sometimes are, connected to one or more of the PLMNs (402, 404). The DL data path for a MUSIM UE may be, and sometimes is, switched between the two PLMNs, e.g., via control signaling sent to MP Proxy 416 from SMF 604, e.g., via a new SMF-MP Proxy interface 518. PLMN-A 402 includes RAN 403, e.g., a wireless base station, and a plurality of additional components, e.g., including core network components, (PLMN-A component 1 409, . . . , PLMN-A component n 411, e.g., a UPF), which are coupled together. PLMN-B 404 includes RAN 502, AMF 602, SMF 604, UPF 506 and MP Proxy 416 which are coupled together. The various elements in PLMN-B 404 are coupled together as shown in FIGS. 4 and 5. MP Proxy 416 can be, and sometimes is, coupled to UPF 506 via link 1508. MP proxy 416 of PLMN-B 404 can be, and sometimes is, coupled to PLMN-A component 411 via link or path 1506. MP proxy 416 is coupled to Internet 410. Nodes 606, 608, e.g., communications session endpoint and/or sources of DL data for a MUSIM UE, are also coupled to Internet 410. Exemplary wireless connection 1502 is shown which, when present, couples MUSIM UE 1 406 to RAN 403 of PLMN-A 402. Exemplary wireless connection 1504 is shown which, when present, couples MUSIM UE 1 406 to RAN 502 of PLMN-B 404.

Numbered List of Exemplary Method Embodiments

Method Embodiment 1. A communications method, the method comprising: receiving (650), from a Multi-Universal SIM (MUSIM) UE (406) connected to a first Public Land Mobile Network (PLMN) (PLMN-A 402) that does not support MUSIM UE away messaging (term for the functions relating to enhanced MUSIM messaging and thus making PLMN-A a non-enhanced network), at an Access and Mobility Management Function (AMF) (602) of a second Public Land Mobile Network PLMN (PLMN-B 404) that supports Multi-Universal SIM (MUSIM) UE away messaging and which includes a proxy component (PLMN-B Proxy 416) for supporting interaction with a PLMN (PLMN-A 402) that does not support MUSIM UE away messaging, an "I am back" message (650); in response to the received "I am back" message (650) operating the AMF (602) of the second PLMN (PLMN-B 404) to signal (652) a Session Management Function (SMF) (604) of the second PLMN (PLMN-B 404) to start preparing a user plane connection for the MUSIM UE; and operating the SMF 604 to instruct (signal) (660) the proxy component (PLMN-B Multi-Path (MP) Proxy 416) to switch a downlink (DL) path for the MUSIM UE from the first PLMN (PLMN-A) to the second PLMN (PLMN-B) (e.g., send message 662 to the MP Proxy 416 indicating that the MP Proxy is to switch the DL data path from the PLMN-A path to the PLMN-B path).

Method Embodiment 1A. The communications method of Method Embodiment 1, wherein operating the AMF (602) of the second PLMN (PLMN-B 404) to signal (652) a Session Management Function (SMF) (604) of the second PLMN (PLMN-B 404) to start preparing a user plane connection for the MUSIM UE includes operating (654) the AMF (602) to send a return indication message (656) to the SMF (604).

Method Embodiment 2. The method of Method Embodiment 1, further comprising: operating the proxy component (MP Proxy 416) to receive (664) an instruction (message 662) to switch the downlink path (DL) for the MUSIM UE from the first PLMN (PLMN-A) to the second PLMN (PLMNB); and operating the proxy component (PLMN-B MP Proxy 416), in response to a received instruction (message 662) to switch the downlink path (DL) for the MUSIM UE from the first PLMN (PLMN-A) to the second PLMN (PLMN-B 404), to forward (666 including 668) DL data for the MUSIM UE received in the second PLMN (PLMN-B 404) to an UPF (uplink path function) component (506) of the second PLMN (404).

Method Embodiment 3. The method of Method Embodiment 2, further comprising: receiving (684), from the MUSIM UE (406), at the AMF (602) of the second PLMN (404) a message (682) indicating that the MUSIM UE is leaving but will return shortly.

Method Embodiment 3aa. The method of Method Embodiment 3, wherein the message indicating "I am back" and the message indicating that the MUSIM UE is leaving but will return shortly are communicated in the same message. Furthermore, this indication of "MUSIM UE is leaving but will return shortly" can be and sometimes is based on Paging filtering rule included by the UE set to "no filter".

Method Embodiment 3a. The method of Method Embodiment 2, further comprising: operating the AMF (602) to send (692) a message ((leave, short) indicator message 694) to the SMF (604), indicating that the MUSIM UE is leaving but will return shortly, in response to receiving the message (682) indicating that the MUSIM UE is leaving but will return shortly; operating the SMF (604) to receive the message ((leave, short) indicator message 694) from the AMF (602), indicating that the MUSIM UE is leaving but will return shortly; and operating the SMF (604) to send (698) a message (buffer message 699) to the UPF (506) indicating that the UPF (506) should start buffering DL data for the MUSIM UE, in response to receiving the message ((leave, short) indicator message 694) from the AMF (602), indicating that the MUSIM UE is leaving but will return shortly.

Method Embodiment 4. The method of Method Embodiment 3, further comprising: operating the UPF component (506) of the second PLMN (PLMN-B 404) to begin buffering (708) DL data for the MUSIM UE (406) following receipt of the message from the MUSIM UE (406) indicating that it is leaving but will return shortly.

Method Embodiment 5. The method of Method Embodiment 4, further comprising: operating the RAN (502) of the second PLMN (PLMN-B) to send (688) a radio resource connection release message (690) to the MUSIM UE (406) in response to the receipt of the message (682) indicating that the MUSIM UE (406) is leaving but will return shortly by the AMF (602).

Method Embodiment 6. The method of Method Embodiment 5, wherein the UPF (506) of the second PLMN (404) buffers DL data for the MUSIM UE (406) while there is no radio network user data plane to the UE (406) (e.g., due to the release of radio connection resources in the second PLMN (PLMN-B).

Method Embodiment 6A. The method of Method Embodiment 6, further comprising: starting (676) a local timer (fast leaving timer), corresponding to the MUSIM UE (406), at the SMF component (604) of the second PLMN (404), in response to receiving the return indicator (656) corresponding to the MUSIM UE (406) at the SMF component (604); and wherein the SMF component (604) of the second PLMN (PLMN-B 404) sends (698) a buffer instruction (699) to the UPF (506) of the second PLMN (PLMN-B 404) to trigger buffering of DL data for the MUSIM UE while the MUSIM UE does not have a radio connection supporting a data path at the second PLMN in response to determining that the I am leaving but will return shortly message (694) was received from the AMF (602) prior to expiration of the fast leaving timer.

Method Embodiment 7. The method of Method Embodiment 5, further comprising: receiving (748) at the AMF (602) of the second PLMN (PLMN-B) (404) an "I am back" message (746) indicating that the MUSIM UE (406) is back in the second PLMN (404); operating the AMF (602) of the second PLMN (404) to send (752) a message (return message 754) indicating that the MUSIM UE (406) is back and that the SMF (604) should start preparing a user plane connection for the MUSIM UE (406); and operating the SMF (604) of the second PLMN (404) to send (758) a message (return message 760) indicating that the MUSIM UE (406) is back and that the UPF (506) should establish a user plane connection for the MUSIM UE (406).

Method Embodiment 8. The method of Method Embodiment 7, further comprising: operating the UPF (506) of the second PLMN (404) to establish (763) a user plane connection to the MUSIM UE (406) (e.g., via a base station (RAN 502) and radio connection of the second PLMN (404)); and operating the UPF (506) of the second PLMN to forward (768) buffered DL data which was stored while the UE (406) was absent from the second PLMN (404) to the MUSIM UE (406) (thus DL data that was directed to the UE but was temporarily undeliverable due to the MUSIM UE's temporary departure from the second PLMN is delivered).

Method Embodiment 9. The method of Method Embodiment 8, further comprising: operating the AMF (602) of the second PLMN (404) to receive (794) a message (792) indicating the MUSIM UE (406) is leaving for a long time; operating the AMF (602) to communicate (send) (796) a message (798) (via interface N11) to the SMF (604) indicating that the MUSIM UE (406) is leaving for a long time; and operating the SMF (604) of the second PLMN (PLMN-B 404) to signal (802) the proxy component (PLMN-B MP proxy (416)) at the second PLMN (404) to switch the DL path for the MUSIM UE (406) from the second PLMN (PLMN-B 404) to the first PLMN (PLMN-A 402) (e.g., send switch message 804 to the PLMN MP proxy 416 to switch path from PLMN-B path 420 to PLMN-A path 418). This indication of "MUSIM UE is leaving for a long time" can be, and sometimes is, based on a Paging filtering rule included in and/or set by the UE with the rule indicating a "particular Data Network Name (DNN)." which the UE sets to indicate the data network it is leaving for a long time.

Method Embodiment 10. The method of claim 9, further comprising: operating the SMF (604) of the second PLMN (PLMN-B 404) to instruct (814) the UPF (506) of the second PLMN (PLMN-B 404) to discard DL data corresponding to the MUSIM UE (e.g., buffered or received DL data for the MUSIM UE) (e.g., send discard message 816 to the UPF 506); and operating the UPF (506) of the second PLMN 404 to discard (820) DL data that was directed to the MUSIM UE (406).

Numbered List of Exemplary System Embodiments

System Embodiment 1. A communications system comprising: a second Public Land Mobile Network (PLMN-B) (404) including: an Access and Mobility Management Function (AMF) device (602 or 1100) including a first processor (1102); a Session Management Function (SMF) device (604 or 1200) including a second processor (1202); and a Proxy component (PLMN-B Multi-Path (MP) Proxy 416); and wherein the first processor (1102) is configured to: operate the AMF device (602) to: receive (650), from a Multi-Universal SIM (MUSIM) UE (406) connected to a first Public Land Mobile Network (PLMN) (PLMN-A 402) that does not support MUSIM UE away messaging (term for the functions relating to enhanced MUSIM messaging and thus making PLMN-A a non-enhanced network), at the Access and Mobility Management Function (AMF) device (602) of the second Public Land Mobile Network (PLMN) (PLMN-B) that supports Multi-Universal SIM (MUSIM) UE away messaging and which includes a proxy component (PLMN-B MP Proxy 416) for supporting interaction with a PLMN that does not support MUSIM UE away messaging, an "I am back" message (650); and in response to the received "I am back" message, operate the AMF device (602) of the second PLMN (PLMN-B 404) to signal (652) the SMF device (604) of the second PLMN (PLMN-B 404) to start preparing a user plane connection for the MUSIM UE (406); and wherein the second processor (1202) is configured to operate the SMF device (604) to instruct (signal 658) the proxy component (PLMN-B MP Proxy 416) to switch a downlink (DL) path for the MUSIM UE (406) from the first PLMN (PLMN-A 402) to the second PLMN (PLMN-B 404) (e.g., send message 662 to the MP Proxy 416 indicating that the MP Proxy (416) is to switch the DL data path from the PLMN-A path (418) to the PLMN-B path (420).

System Embodiment 1A. The communications system of System Embodiment 1, wherein the first processor (1102) is configured to: operate (654) the AMF (602) to send a return indication message (656) to the SMF (604), as part of being configured to operate the AMF (602) of the second PLMN (PLMN-B 404) to signal (652) a Session Management Function (SMF) (604) of the second PLMN (PLMN-B 404) to start preparing a user plane connection for the MUSIM UE.

System Embodiment 2. The communications system of System Embodiment 1, wherein said proxy component (416) includes a third processor (1302), and wherein the third processor (1302) is configured to: operate the proxy component (MP Proxy 416) to receive (664) an instruction (message 662) to switch the downlink path (DL) for the MUSIM UE from the first PLMN (PLMN-A) to the second PLMN (PLMN-B); and operate the proxy component (PLMN-B Proxy 416), in response to a received instruction (message 663) to switch the downlink path (DL) for the MUSIM UE from the first PLMN (PLMN-A 402) to the second PLMN (PLMN-B 404), to forward (666 including 668) DL data for the MUSIM UE received in the second PLMN (404) to a user plane function (UPF) component (506) of the second PLMN (404).

System Embodiment 3. The communications system of claim 2, wherein the first processor (1102) is further configured to: operate the AMF device (602) to receive (684), from the MUSIM UE (406), at the AMF (602) of the second PLMN (404) a message (682) indicating that the MUSIM UE (406) is leaving but will return shortly.

System Embodiment 3a. The communications system of System Embodiment 2, wherein said first processor (1102) is further configured to: operate the AMF (602) to send (692) a message ((leave, short) indicator message 694) to the SMF (604), indicating that the MUSIM UE is leaving but will return shortly, in response to receiving the message (682) indicating that the MUSIM UE is leaving but will return shortly; and wherein said second processor (1202) is further configured to: operate the SMF (604) to receive the message ((leave, short) indicator message 694) from the AMF (602), indicating that the MUSIM UE is leaving but will return shortly; and operate the SMF (604) to send (698) a message (buffer message 699) to the UPF (506) indicating that the UPF (506) should start buffering DL data for the MUSIM UE, in response to receiving the message ((leave, short) indicator message 694) from the AMF (602), indicating that the MUSIM UE is leaving but will return shortly.

System Embodiment 4. The communications system of System Embodiment 3, further comprising: said UPF component (506) including a fourth processor (1402), and wherein said fourth processor (1402) is configured to operate the UPF component (506) of the second PLMN (PLMN-B 404) to begin buffering (708) DL data for the MUSIM UE (406) following receipt of the message from the MUSIM UE indicating that it is leaving but will return shortly.

System Embodiment 5. The communications system of System Embodiment 4, further comprising: a radio access network (RAN) device (e.g., wireless base station) (502 or 1000) of the second PLMN (PLMN-B 404), said RAN including a fifth processor (1002), and wherein said fifth processor (1002) is configured to: operate the RAN device (502) of the second PLMN (PLMN-B 404) to send a radio resource connection release message (690) to the MUSIM UE (406) in response to the receipt of the message (682) indicating that the MUSIM UE (404) is leaving but will return shortly by the AMF (602).

System Embodiment 6. The communications system of System Embodiment 5, wherein the UPF component (506) of the second PLMN (404) buffers DL data for the MUSIM UE (406) while there is no radio network user data plane to the UE (406) (e.g., due to the release of radio connection resources in the second PLMN (PLMN-B 404).

System Embodiment 6A. The communications system of System Embodiment 6, wherein said second processor (1202) is further configured to start (676) a local timer (fast leaving timer), corresponding to the MUSIM UE (406), at the SMF device (604) of the second PLMN (404), in response to receiving the return indicator corresponding to the MUSIM UE (406) at the SMF device (604); and wherein said second processor (1202) is further configured to operate the SMF device (604) of the second PLMN (PLMN-B 404) to send (698) a buffer instruction (699) to the UPF component (506) of the second PLMN (PLMN-B 404) to trigger buffering of DL data for the MUSIM UE (406) while the MUSIM UE (406) does not have a radio connection supporting a data path at the second PLMN (404) in response to determining that the I am leaving but will return shortly message (694) was received from the AMF device (602) prior to expiration of the fast leaving timer.

System Embodiment 7. The communications system of System Embodiment 5, wherein said first processor (1102) is further configured to: operate the AMF device (602) of the second PLMN (B) 404 to receive an "I am back" message (746) indicating that the MUSIM UE (406) is back in the second PLMN (404); operate the AMF device (602) of the second PLMN (404) to send (752) a message (return message 754) indicating that the MUSIM UE (406) is back and that the SMF (604) should start preparing a user plane connection for the MUSIM UE (406); and wherein said second processor (1202) is further configured to: operate the SMF device (604) of the second PLMN (404) to send (758) a message (return message 760) indicating that the MUSIM UE (406) is back and that the UPF component (506) should establish a user plane connection for the MUSIM UE (406).

System Embodiment 8. The communications system of System Embodiment 7, wherein said third processor (1302) is configured to: operate the UPF component (506) of the second PLMN (404) to establish (763) a user plane connection for the MUSIM UE (406) (e.g., via a base station (RAN 502) and radio connection of the second PLMN (404)); and operate the UPF component (506) of the second PLMN (404) to forward (768) buffered DL data which was stored while the UE (406) was absent from the second PLMN (404)

to the MUSIM UE (406) (thus DL data that was directed to the UE (406) but was temporarily undeliverable due to the MUSIM UE's temporary departure from the second PLMN (404) is delivered).

System Embodiment 9. The communications system of System Embodiment 8, wherein said first processor (1102) is further configured to: operate the AMF device (602) of the second PLMN (404) to receive (794) (via N1 interface) from the MUSIM UE (406) a message (792) indicating the MUSIM UE (406) is leaving for a long time; and operate the AMF device (602) to communicate a message (via N11 interface) to the SMF device (604) indicating that the MUSIM UE (406) is leaving for a long time; and wherein said second processor (1202) is further configured to: operate the SMF device (604) of the second PLMN (PLMN-B 404) to signal (802) the proxy component (MP proxy (416)) of the second PLMN (404) to switch the DL path for the MUSIM UE from the second PLMN (PLMN-B 404) to the first PLMN (PLMN-A 402) (e.g., send switch message 804 to MP proxy 416).

System Embodiment 10. The communications system of System Embodiment 9, wherein said second processor (1202) is further configured to: operate the SMF device (604) the second PLMN (PLMB) to instruct (814) the UPF device (506) of the second PLMN (PLMN-B 404) to discard DL data corresponding to the MUSIM UE (406) (e.g., buffered or received DL data for the MUSIM UE 406); and wherein the third processor (1302) is further configured to: operate the UPF (506) of the second PLMN (PLMN-B 404) to discard (820) DL data that was directed to the MUSIM UE (406).

Various embodiments are directed to apparatus, MUSIM UEs, RAN devices, AMF devices, SMF devices, UPF devices, MP Proxy devices, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g., mobility management entities (MMEs), a Spectrum Access System (SAS), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating MUSIM UEs, RAN devices, AMF devices, SMF devices, UPF devices, MP Proxy devices, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, SAS, an AFC system, cable networks, cloud networks, nodes, servers, cloud service servers, customer premises equipment devices, controllers, network monitoring nodes and/or servers and/or cable or network equipment devices. Various embodiments are directed to communications network which are partners, e.g., a MVNO network and a MNO network, a PLMN which is not MUSIM enhanced and a PLMN which is MUSIM enhanced. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a MUSIM UE, RAN device, AMF device, SMF device, UPF device, MP Proxy device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g., a MME, SAS, a AFC system, etc., said device including a processor configured to implement one, multiple or all of the steps of one or more methods of the invention.

In some embodiments, the processor or processors, e.g., CPUs, of one or more devices, e.g., communications nodes such as e.g., MUSIM UEs, RAN devices, AMF devices, SMF devices, UPF devices, MP Proxy devices, access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g., a CBSD, an device such as a cellular base station e.g., an eNB, a MNO HSS server, a MVNO HSS device server, a UE device, a relay device, e.g., a MME, a SAS, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., MUSIM UE, RAN device, AMF device, SMF device, UPF device, MP Proxy device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g., a CBSD, an device such as a cellular base station e.g., an eNB, a MNO HSS server, a MVNO HSS device server, a UE device, a relay device, e.g., a MME, includes a component corresponding to each of one or more of the steps of the various described methods performed by the device in which the processor is included. In some but not all embodiments a device, e.g., a communications node such as e.g., MUSIM UE, RAN device, AMF device, SMF device, UPF devices, MP Proxy device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g., a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a communications nodes such as e.g., MUSIM UE, RAN device, AMF device, SMF device, UPF device, MP Proxy device, an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, security device, a AFC system, MNVO base station, e.g., a CBSD, an MNO cellular base station, e.g., an eNB or a gNB, a HSS server, a UE device, a SAS or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

In various embodiments functions and/or components are implemented using one or more processors configured to perform the recited function. The functions and/or components can be implemented in a computing cloud. The processing cloud may and normally does include multiple processors available for use, with one of the processors being used to perform the function and/or steps associated with the function or component being implemented. Different physical processors in the computing can be used as different functions and/or components of the communications system of the present invention.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
operating a proxy component of a second Public Land Mobile Network (PLMN), that supports Multi-Universal SIM (MUSIM) user equipment (UE) away messaging and which includes said proxy component, said proxy component for supporting interaction with a first PLMN, that does not support MUSIM UE away messaging, to receive an instruction to switch a downlink (DL) path for a MUSIM UE from the first PLMN to the second PLMN; and
operating the proxy component, in response to a received instruction to switch the DL path for the MUSIM UE from the first PLMN to the second PLMN, to forward DL data for the MUSIM UE received in the second PLMN to a user plane function (UPF) of the second PLMN.

2. The method of claim 1, further comprising:
operating an Access and Mobility Management Function (AMF) of the second PLMN to receive a message indicating the MUSIM UE is leaving for a long time; and
operating the AMF to communicate a message to a Session Management Function (SMF) of the second PLMN indicating that the MUSIM UE is leaving for a long time.

3. The method of claim 2, further comprising:
operating the SMF of the second PLMN to signal the proxy component at the second PLMN to switch the DL path for the MUSIM UE from the second PLMN to the first PLMN.

4. The method of claim 3, further comprising:
operating the SMF of the second PLMN to instruct the UPF of the second PLMN to discard DL data corresponding to the MUSIM UE.

5. The method of claim 4, further comprising:
operating the UPF of the second PLMN to discard DL data that was directed to the MUSIM UE.

6. The method of claim 5, further comprising:
operating a radio access network (RAN) of the first PLMN to receive a radio resource control (RRC) connection request from the MUSIM UE.

7. The method of claim 6, further comprising:
operating the RAN of the first PLMN to establish a data radio bearer connection between the MUSIM UE and the RAN of the first PLMN.

8. The method of claim 7, further comprising:
operating the RAN of the first PLMN to communicate user data for the MUSIM UE.

9. The method of claim 8, further comprising:
operating the first PLMN to communicate user data for the MUSIM UE.

10. The method of claim 9, wherein said proxy component is a Multi-Path (MP) proxy, the method further comprising:
operating the MP proxy of the second PLMN to communicate user plane data for the MUSIM UE.

11. A communications system comprising:
a second Public Land Mobile Network (PLMN) including:
an Access and Mobility Management Function (AMF) device including a first processor;
a Session Management Function (SMF) device; and
a Proxy component that supports Multi-Universal SIM (MUSIM) user equipment (UE) away messaging and interaction with a first PLMN, that does not support MUSIM UE away messaging, said Proxy component being configured to:
receive an instruction to switch a downlink (DL) path for a MUSIM UE from the first PLMN to the second PLMN; and
in response to the received instruction to switch the DL path for the MUSIM UE from the first PLMN to the second PLMN, to forward DL data for the MUSIM UE received in the second PLMN to a user plane function (UPF) component of the second PLMN.

12. The communications system of claim 11, further comprising:
an AMF in the second PLMN configured to:
receive a message indicating the MUSIM UE is leaving for a long time; and
communicate, in response to receiving the message indicating the MUSIM UE is leaving for a long time, a message to a SMF of the second PLMN indicating that the MUSIM UE is leaving for a long time.

13. The communication system of claim 12, wherein the SMF of the second PLMN is further configured to:
switch the DL path for the MUSIM UE from the second PLMN to the first PLMN.

14. The communications system of claim 13, wherein the SMF of the second PLMN is further configured to:
instruct the UPF of the second PLMN to discard DL data corresponding to the MUSIM UE.

15. The communications system of claim 14, wherein the UPF of the second PLMN is configured to:
discard DL data that was directed to the MUSIM UE.

16. The communication system of claim 15, further comprising:
a radio access network (RAN) in the first PLMN configured to:
receive a radio resource control (RRC) connection request from the MUSIM UE.

17. The communications system of claim 16, wherein the RAN in the first PLMN is further configured to:
establish a data radio bearer connection between the MUSIM UE and the RAN of the first PLMN.

18. The communications system of claim 17, wherein the RAN of the first PLMN is further configured to:
communicate user data for the MUSIM UE.

19. The communications system of claim 18, wherein first PLMN is configured to:
communicate user data for the MUSIM UE.

20. The communication system of claim 19, wherein said Proxy component is a Multi-Path (MP proxy), and wherein the MP proxy of the second PLMN is configured to:
communicate user plane data for the MUSIM UE.

\* \* \* \* \*